(12) United States Patent
Chu-Ke et al.

(10) Patent No.: US 10,871,687 B2
(45) Date of Patent: Dec. 22, 2020

(54) DISPLAY DEVICE

(71) Applicant: AU OPTRONICS CORPORATION, Hsin-Chu (TW)

(72) Inventors: Hui Chu-Ke, Hsin-Chu (TW); Sheng-Wen Cheng, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 16/528,789

(22) Filed: Aug. 1, 2019

(65) Prior Publication Data
US 2020/0057324 A1   Feb. 20, 2020

(30) Foreign Application Priority Data

Aug. 14, 2018   (TW) .............................. 107128358 A

(51) Int. Cl.
G02F 1/1347   (2006.01)
G02B 30/27    (2020.01)
G02F 1/1337   (2006.01)
G02F 1/1343   (2006.01)

(52) U.S. Cl.
CPC .......... *G02F 1/1347* (2013.01); *G02B 30/27* (2020.01); *G02F 1/1337* (2013.01); *G02F 1/134363* (2013.01)

(58) Field of Classification Search
CPC .............. G02F 1/1337; G02F 1/134363; G02F 1/133526; G02F 1/13471; G02F 1/1333; G02F 1/1347; G02F 1/13336; G02F 1/1336; G02F 2001/133607; G02F 2001/133616; G02F 1/133606; G02F 1/133504; G02F 1/133615; G02F 1/133308; G02F 2001/133317; G02F 2001/133322; G02B 30/27; G02B 6/0088; G02B 6/005; G02B 6/0068; G02B 6/0073; G02B 6/0083
USPC ..................................................... 349/73–74
See application file for complete search history.

(56) References Cited

U.S. PATENT DOCUMENTS

| | | | |
|---|---|---|---|
| 5,953,148 A * | 9/1999 | Moseley | H04N 13/324 359/237 |
| 7,796,226 B2 | 9/2010 | Yamada et al. | |
| 7,965,365 B2 | 6/2011 | Uehara et al. | |
| 9,715,855 B2 | 7/2017 | Huang et al. | |
| 2003/0214615 A1 * | 11/2003 | Colgan | G02B 6/0053 349/65 |

(Continued)

FOREIGN PATENT DOCUMENTS

| | | |
|---|---|---|
| JP | 2006-201485 | 8/2006 |
| TW | I362529 | 4/2012 |
| TW | I537602 | 6/2016 |

*Primary Examiner* — Shan Liu
(74) *Attorney, Agent, or Firm* — WPAT, PC

(57) ABSTRACT

The present invention provides a display device, including a first display panel, a second display panel, and a plurality of first lenses. The first display panel has a light emitting surface and includes a plurality of first sub-pixels. Each of the first sub-pixels has a first sub-pixel width. The second display panel is located at one side of the light emitting surface of the first display panel and includes a plurality of second sub-pixels. Each of the second sub-pixels has a second sub-pixel width. The first lenses are disposed between the first display panel and the second display panel. Each of the first lenses has a first diameter, and the first diameter is smaller than the second sub-pixel width.

13 Claims, 23 Drawing Sheets

(56) References Cited

U.S. PATENT DOCUMENTS

| | | | |
|---|---|---|---|
| 2005/0185115 A1* | 8/2005 | Yee | G02B 6/005 349/95 |
| 2007/0171493 A1* | 7/2007 | Nakanishi | G02B 3/0006 359/15 |
| 2008/0180586 A1* | 7/2008 | Tomizuka | G02F 1/133526 349/15 |
| 2008/0180587 A1* | 7/2008 | Tomizuka | G02F 1/133526 349/15 |
| 2009/0147186 A1* | 6/2009 | Nakai | G02F 1/13471 349/74 |
| 2010/0079584 A1* | 4/2010 | Sung | H04N 13/305 348/52 |
| 2010/0157228 A1 | 6/2010 | Sakurai et al. | |
| 2010/0207862 A1 | 8/2010 | Xu et al. | |
| 2011/0134648 A1* | 6/2011 | Lin | F21V 5/007 362/311.06 |
| 2011/0141405 A1* | 6/2011 | Kitagawa | G02F 1/133504 349/74 |
| 2012/0268481 A1* | 10/2012 | Niioka | H04N 13/317 345/619 |
| 2015/0009560 A1* | 1/2015 | Kang | G02B 30/27 359/463 |
| 2015/0138459 A1* | 5/2015 | Tsuruyama | G02B 30/27 349/15 |
| 2019/0265560 A1* | 8/2019 | Fukami | G09F 9/302 |

* cited by examiner

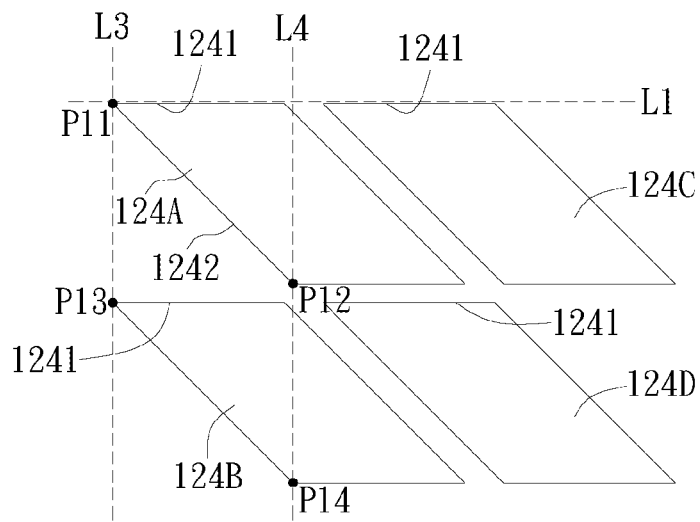
FIG. 14A
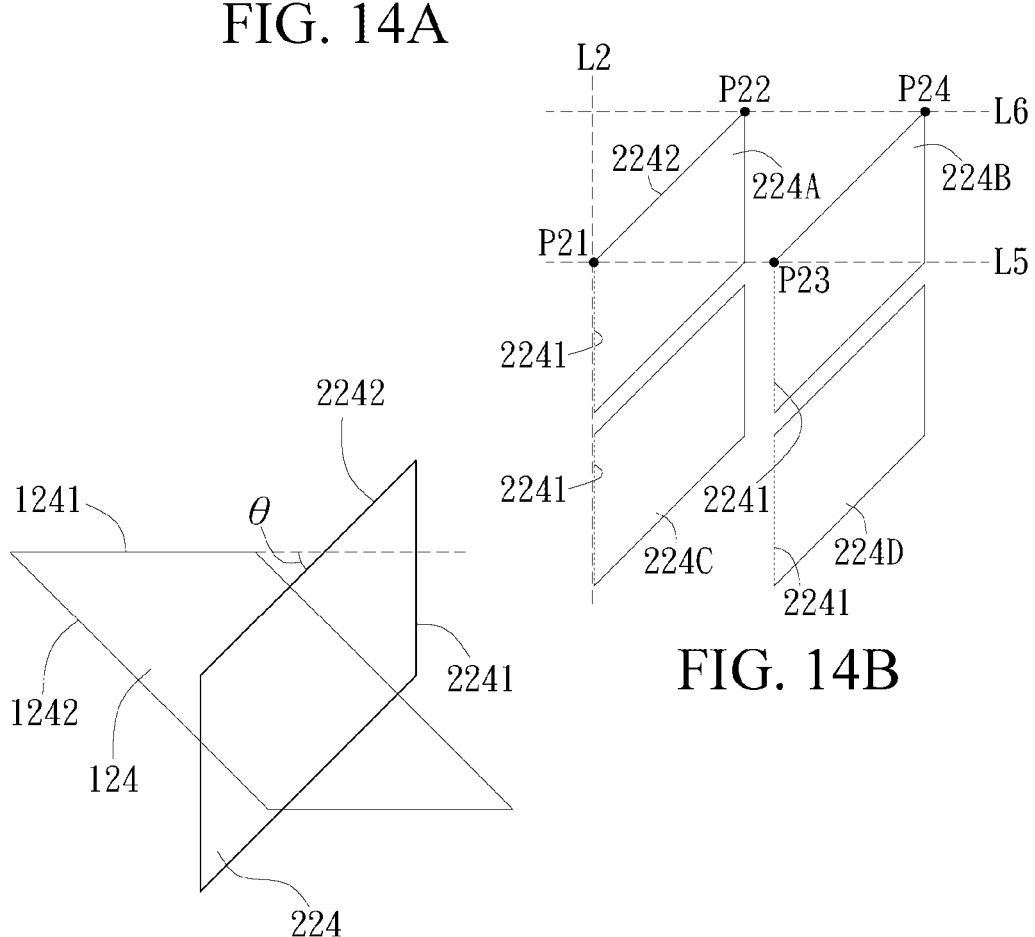
FIG. 14B
FIG. 14C

DISPLAY DEVICE

BACKGROUND

Technical Field

The present invention relates to a display device, and in particular, the present invention relates to a display device having a plurality of display panels

Related Art

In general, a liquid crystal display device has a color filter layer and a thin film transistor layer. The thin film transistor layer has a plurality of pixel electrode and a plurality of lines for transmitting display signals. These lines are generally made of a metal material. The color filter layer has a plurality of light transmissive regions, and the light transmissive regions are separated by a light shielding structure such as a black matrix.

In order to meet product requirements, the display device may not only be designed to be formed by a single display panel, but also be designed to be formed by a plurality of combined stacked display panels. A display device consisting of a plurality of display panels have a plurality of color filter layers and a plurality of thin film transistor layers. However, when the display panels are stacked and combined, there may be some slight displacement between the display panels. Consequently, light shielding layers and metal lines in different display panels cannot be well aligned, causing an interference pattern during displaying of an image and affecting display quality. Therefore, the existing display device still needs to be improved.

SUMMARY

One object of the present invention is to provide a display device that can improve image quality of a displayed image.

The display device includes a first display panel, a second display panel, and a plurality of first lenses. The first display panel has a light emitting surface. The first display panel includes a plurality of first sub-pixels. Each of the first sub-pixels has a first sub-pixel width. The second display panel is located at one side of the light emitting surface of the first display panel. The second display panel includes a plurality of second sub-pixels. Each of the second sub-pixels has a second sub-pixel width. The first lenses are disposed between the first display panel and the second display panel. Each of the first lenses has a first diameter. Each of the first diameters is smaller than the second sub-pixel width.

A pixel structure is located within a first display panel and a second display panel. The second display panel is stacked on the first display panel. The pixel structure includes a plurality of first sub-pixels and a plurality of second sub-pixels. The first sub-pixels are disposed in the first display panel. Each of the first sub-pixels has a first side and a second side connected to the first side. The second sub-pixels are disposed in the second display panel. Each of the second sub-pixels has a third side and a fourth side connected to the third side. The first side, the second side, the third side, and the fourth side are not parallel to each other. Interference on a displayed image existing when the second display panel is stacked on the first display panel is thereby reduced.

A pixel structure is located within a first display panel and a second display panel. The second display panel is stacked on the first display panel. The pixel structure includes a plurality of first sub-pixels and a plurality of second sub-pixels. The first sub-pixels are disposed in the first display panel. Each of the first sub-pixels has a first side and a second side connected to the first side. The first display panel has a first scanning line and a first data line that are corresponding to the first sub-pixels and that are distributed along the first side and the second side respectively. The second sub-pixels are disposed in the second display panel. Each of the second sub-pixels has a third side and a fourth side connected to the third side. The second display panel has a second data line and a second scanning line that are corresponding to the second sub-pixels and that are distributed along the third side and the fourth side respectively. The first scanning line, the second scanning line, the first data line, and the second data line are not parallel to each other. Interference on a displayed image existing when the second display panel is stacked on the first display panel is thereby reduced.

BRIEF DESCRIPTION OF THE DRAWINGS

FIG. 14A to FIG. 14C are schematic diagrams of correspondences between sides of first sub-pixels and sides of second sub-pixels.

DETAILED DESCRIPTION

Figure 1:
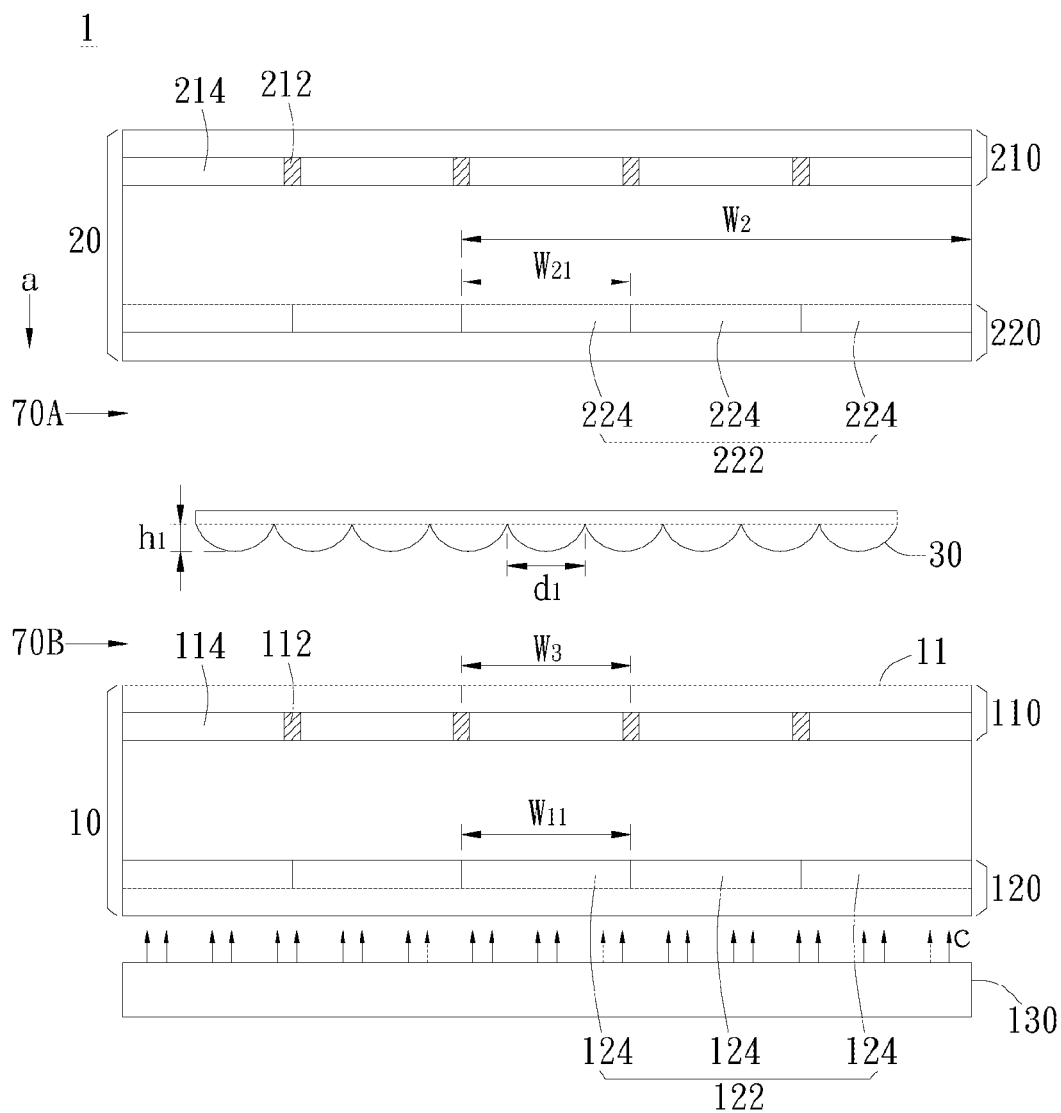
FIG. 1 is a schematic diagram of an embodiment of a display device according to the present invention.

The present invention provides a display device to improve display quality and reduce interference patterns by using a lens and a pixel structure in a display device. Refer to FIG. 1. FIG. 1 is a schematic diagram of an embodiment of a display device 1 according to the present invention. As shown in FIG. 1, the display device 1 includes a first display panel 10, a second display panel 20, and a plurality of first lenses 30. The first display panel 10 has a light outputting surface 11, and the second display panel 20 is located at one side of the light outputting surface 11 of the first display panel 10. For example, the second display panel 20 is stacked above the first display panel 10 directly or indirectly. The first lenses 30 are disposed between the first display panel 10 and the second display panel 20. In this embodiment, the display device 1 further includes a backlit module 130 located at one side of the first display panel 10 opposite to the light outputting surface, and the backlit module 130 may use a well-known direct-type light source or a side-entry light source, to provide a light source required by the display device. However, in other embodiments, the display device 1 may use a front light source or an ambient light instead of a backlit light source.

As shown in FIG. 1, the first display panel 10 includes a plurality of first sub-pixels 124, the plurality of first sub-pixels 124 (ex. at least three sub-pixels of the first sub-pixels) forming a first pixel 122. In particular, the first display panel 10 includes a first substrate 110 and a second substrate 120. The first substrate 110 is, for example, a color filter substrate, and has a plurality of light shielding layers 112. The second substrate 120 is, for example, a thin film transistor substrate. In this embodiment, the second substrate 120 is located between the first substrate 110 and the backlit module 130, but the present invention is not limited thereto. In other embodiments, the first substrate 110 may be located between the second substrate 120 and the backlit module 130. As shown in FIG. 1, the first sub-pixels 124 are disposed on the second substrate 120, and each of the first sub-pixels 124 has a first sub-pixel width $W_{11}$. The light shielding layer 112 is disposed between light filter layers 114. A distance $W_3$ between adjacent light shielding layers 112 is roughly corresponding to the first sub-pixel width $W_{11}$. A region of the light filter layer 114 is corresponding to a region of the first sub-pixel 124.

In another aspect, the second display panel 20 includes a plurality of second sub-pixels 224, the plurality of second sub-pixels 224 (ex. at least three sub-pixels of the second sub-pixels) forming a second pixel 222. The second pixel 222 has a second pixel width $W_2$. The region of the first sub-pixel and the region of the second sub-pixel are roughly corresponding to a shape of a pixel electrode in the sub-pixels. In addition, the second display panel 20 includes a third substrate 210 and a fourth substrate 220. The third substrate 210 is, for example, a color filter substrate, and has a plurality of light shielding layers 212. The fourth substrate 220 is, for example, a thin film transistor substrate. In this embodiment, the fourth substrate 220 is located between the third substrate 210 and the first lens 30, but the present invention is not limited thereto. In other embodiments, the third substrate 210 may be located between the fourth substrate 220 and the first lens 30. As shown in FIG. 1, the second sub-pixels 224 are disposed on the fourth substrate 220, and each of the second sub-pixels 224 has a second sub-pixel width $W_{21}$. The light shielding layer 212 is disposed between light filter layers 214. In the second display panel 20, a distance (not shown) between adjacent light shielding layers 212 is roughly corresponding to the second sub-pixel width $W_{21}$. A region of the light filter layer 214 is corresponding to a region of the second sub-pixel 224. In an embodiment, the first sub-pixel width $W_{11}$ is substantially the same as the second sub-pixel width $W_{21}$, but the present invention is not limited thereto. It should be noted that there may be at least an interval between the first display panel 10 and the second display panel 20 of the display device 1, so that a depth effect may be displayed using the disposed interval, and a displayed image has a stereoscopic effect.

Figure 2:
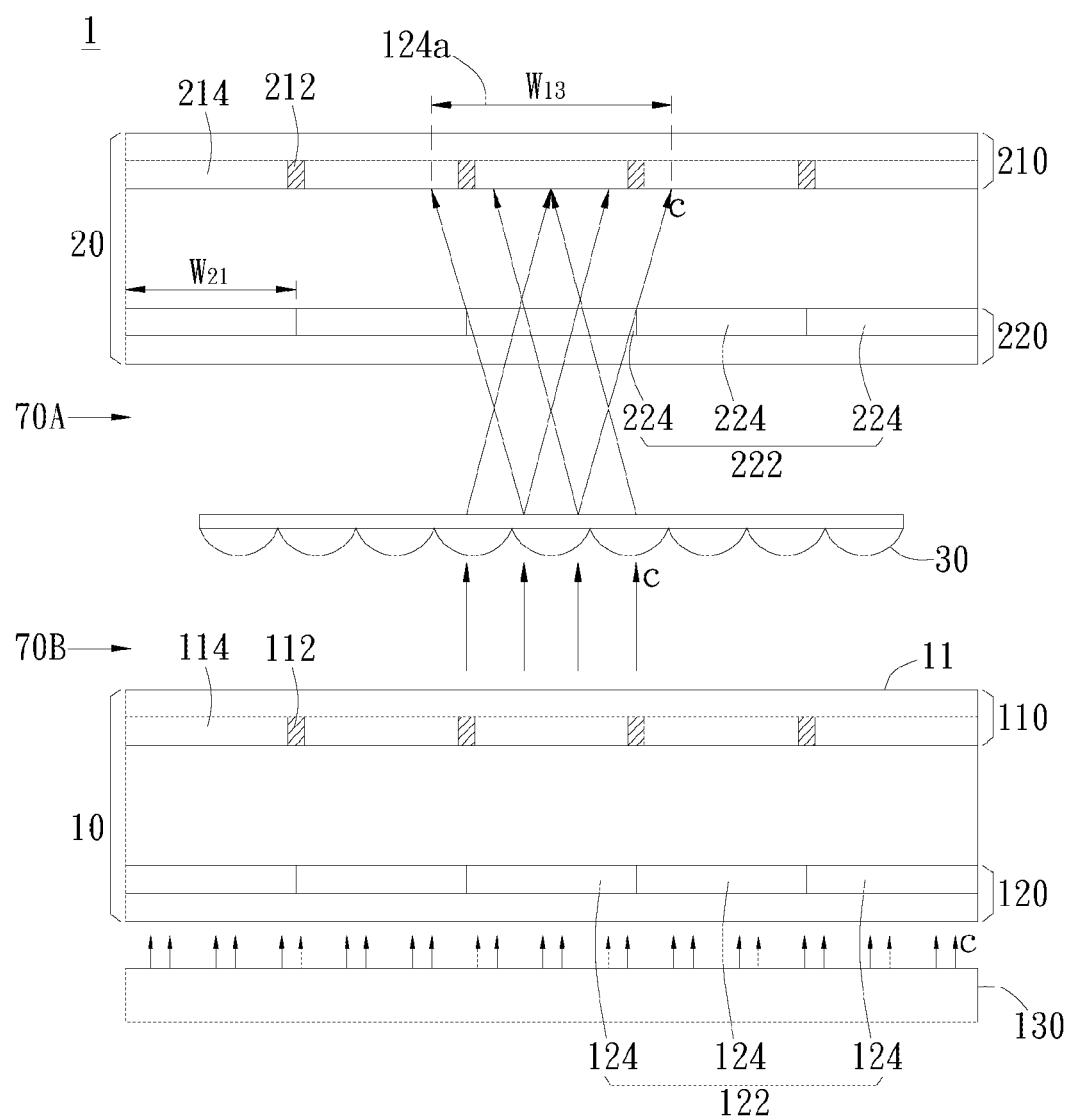
FIG. 2 is a schematic diagram in which a light passes through a first lens.

As shown in FIG. 1, the plurality of first lenses 30 are arranged in parallel to the light outputting surface 11, and each is convex toward the first display panel 10. Each of the first lenses 30 has a first diameter $d_1$. Refer to FIG. 1 and FIG. 2. FIG. 2 is a schematic diagram in which a light c passes through the first lens 30. A display device in FIG. 2 has a structure the same as that of the display device in FIG. 1. As shown in FIG. 2, the light c outputting from the light outputting surface 11 of the first display panel 10 is incident on the first lens 30. For ease of description, only partial lights outputting from the light outputting surface 11 of the first display panel 10 are shown in FIG. 2. The light c is deflected by the first lens 30 to enlarge an irradiation range.

In particular, the lights c outputting from the first sub-pixels 124 of the first display panel 10 form a first zoomed-in pixel region 124a on the second display panel 20 via the first lens 30. The first zoomed-in pixel area 124a has a first zoomed-in width $W_{13}$. Referring to FIG. 1 and FIG. 2, the first zoomed-in width $W_{13}$ is larger than the second sub-pixel width $W_{21}$, and the first zoomed-in width $W_{13}$ is smaller than the second pixel width $W_2$. Since a position of a corresponding light shielding layer in the display panel may reduce a brightness, when the first display panel 10 and the second display panel 20 are not completely aligned, a regular interference pattern is likely to be formed on a displayed image due to a brightness change caused by upper and lower light shielding layers. With the design of enlarging the light irradiation range, the brightness change caused by the upper and lower light shielding layers can be eliminated, and generated interference patterns can be reduced to improve display quality.

As shown in FIG. 1, the first diameter $d_1$ is preferably smaller than the second sub-pixel width $W_{21}$, but a light irradiation range can be enlarged to be larger than the second sub-pixel width $W_{21}$ after the light c (refer to FIG. 2) corresponding to the region of each of the first sub-pixels 124 passes through the first lens 30. In an embodiment, the first lens 30 is a spherical lens, and its shape may be, for example, a just spherical surface or a quasi-spherical surface. A ratio of the first diameter $d_1$ to a height $h_1$ may be, but not limited to, 2:1, and the ratio of the first diameter $d_1$ to the height $h_1$ may be adjusted as required.

In addition, in an embodiment, there may be accommodation space between the first display panel 10 and the second display panel 20 for accommodating the first lens 30, and the first lens 30 and the first display panel 10 and/or the second display panel 20 are spaced apart by a specific interval. In particular, there is an interval 70A between the second display panel 20 and the first lens 30, and there is an interval 70B between the first display panel 10 and a top of the first lens 30.

In addition, a distance between the first lens 30 and the second display panel 20 (that is, a height of the interval 70A) may be further used to adjust the light irradiation range, but the present invention is not limited thereto. In other embodiments, there may be no interval 70A between the first lens 30 and the second display panel 20, and the light irradiation range is adjusted by adjusting a focal length of the first lens 30.

Figure 3:
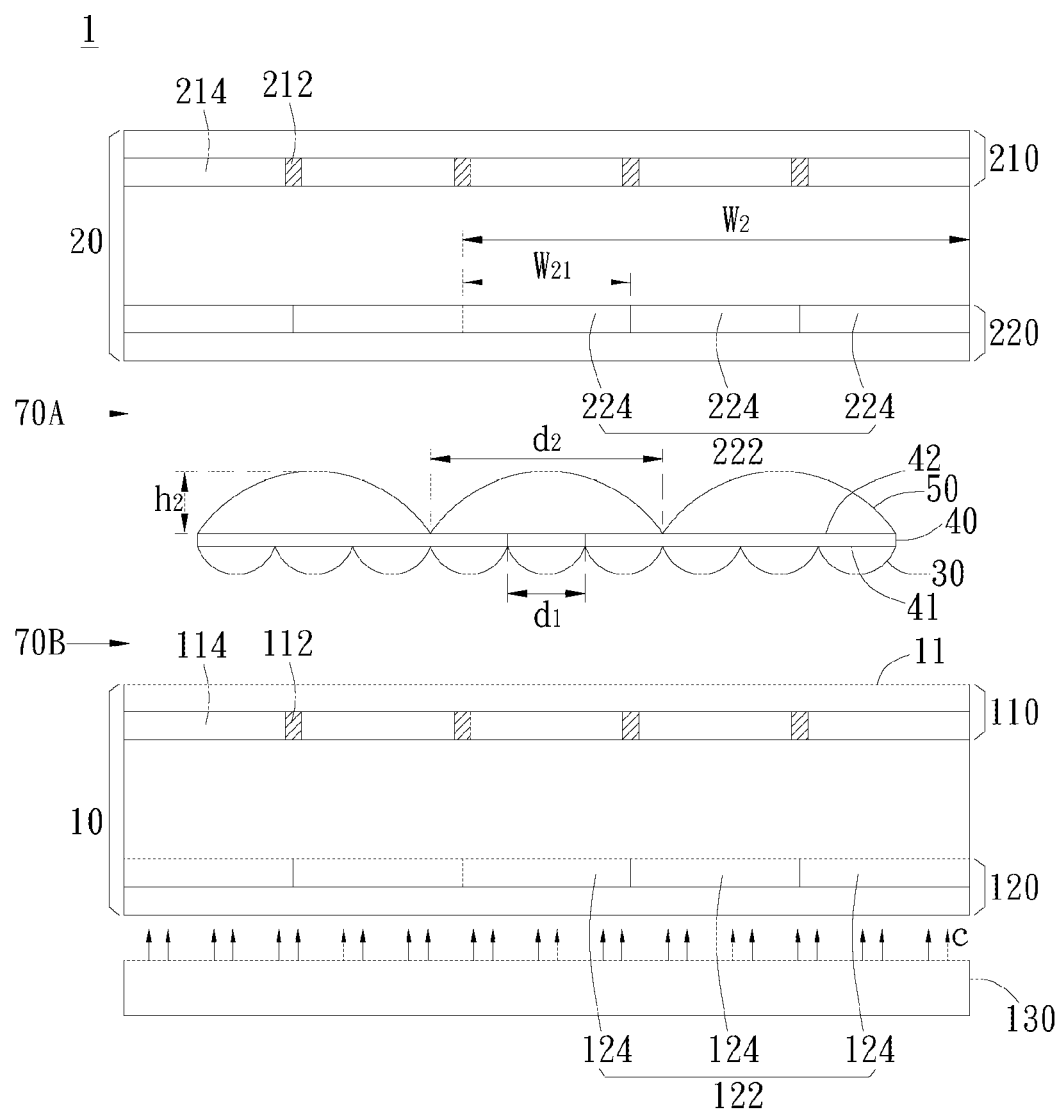
FIG. 3 is a schematic diagram of an embodiment in which a display device has a second lens.

FIG. 3 is a schematic diagram of an embodiment in which the display device 1 has a second lens 50. As shown in FIG. 3, a difference from the foregoing embodiment is that the display device 1 further includes a plurality of second lenses 50. In this embodiment, the first lenses 30 and the second lenses 50 are disposed on a first lens film 40. As shown in FIG. 3, the first lens film 40 is located between the first display panel 10 and the second display panel 20, and has a first surface 41 facing the first display panel 10 and a second surface 42 opposite to the first surface 41. The first lenses 30 are disposed on the first surface 41, and the second lenses 50 are disposed on the second surface 42.

As shown in FIG. 3, the plurality of second lenses 50 are disposed between the second display panel 20 and the first lenses 30, and are arranged in parallel to light outputting surface 11. The second lens 50 is convex toward the second display panel 20, and each has a second diameter $d_2$. With respect to the first lens 30 and the second lens 50, the second diameter $d_2$ is larger than a first diameter $d_1$. In addition, with respect to the second lens 50 and the second pixel 222, the second diameter $d_2$ is preferably smaller than a second pixel width $W_2$ and larger than a second sub-pixel width $W_{21}$.

Figure 4:
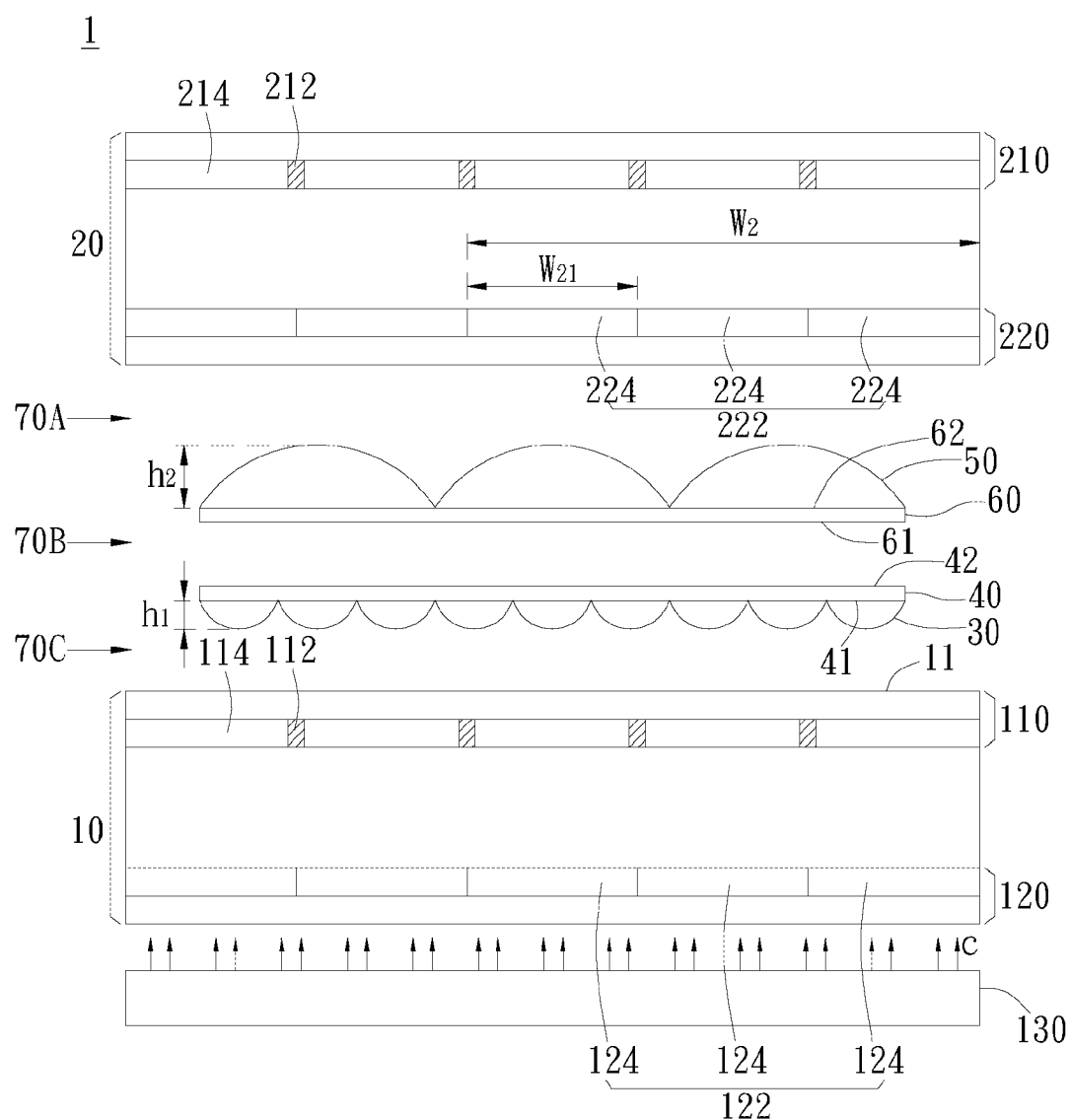
FIG. 4 is a schematic diagram of another embodiment in which a display device has a second lens.

FIG. 4 is a schematic diagram of another embodiment in which the display device 1 has a second lens 50. As shown in FIG. 4, same as the embodiment of FIG. 3, the display device 1 includes a plurality of second lenses 50, except that the second lenses 50 and the first lenses 30 are disposed on different lens films respectively. As shown in FIG. 4, the display device 1 includes a first lens film 40 and a second lens film 60, and the two lens films are located between the first display panel 10 and the second display panel 20. The first lens film 40 is closer to the first display panel 10 than the second lens film 60. The second lens film 60 is located between the first lens film 40 and the second display panel 20.

As shown in FIG. 4, the first lens film 40 has a first surface 41 facing the first display panel 10 and a second surface 42 opposite to the first surface 41. The second lens film 60 has a first surface 61 and a second surface 62 facing the second display panel 20. The first surface 61 and the second surface 62 of the second lens film 60 are also located on opposite sides of the second lens film 60. The first lenses 30 are disposed on the first surface 41 of the first lens film 40, and the second lenses 30 are disposed on the second surface 62 of the second lens film 60.

In addition, in FIG. 4, the first lens film 40 and the second lens film 60 are spaced apart by a specific interval. In this embodiment, there is an interval 70A between the second display panel 20 and a top of the second lens 50, there is an interval 70B between the second lens 50 and the first lens 30, and there is an interval 70C between the first display panel 10 and a top of the first lens 30.

Figure 5:
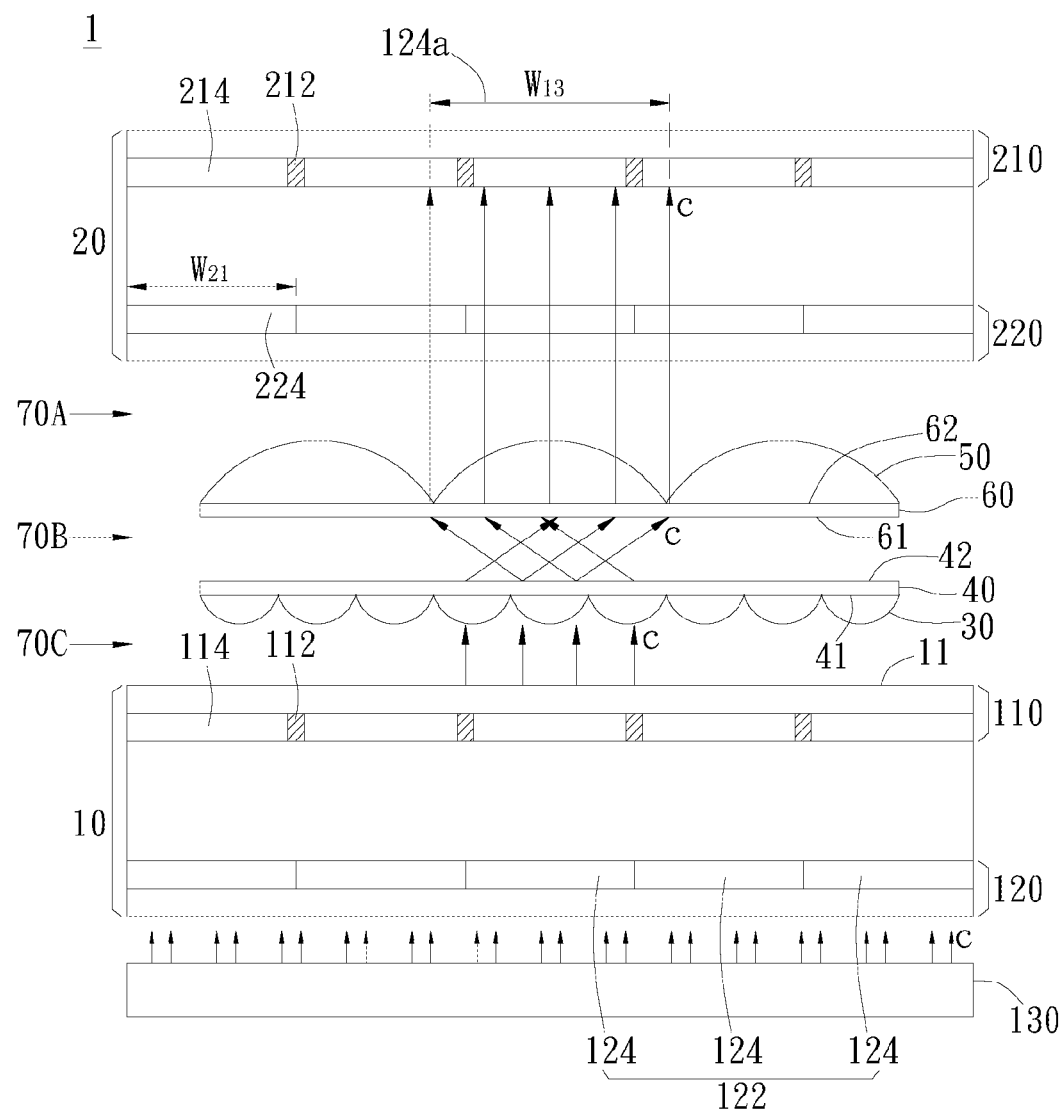
FIG. 5 is a schematic diagram in which a light passes through a first lens and a second lens.

Refer to FIG. 4 and FIG. 5. FIG. 5 is a schematic diagram in which a light c passes through the first lens 30 and the second lens 50. A display device in FIG. 5 has a structure the same as that of the display device in FIG. 4. As shown in FIG. 5, the light c outputting from the light outputting surface 11 of the first display panel 10 is incident on the second lens 50 via the first lens 30. For ease of description, only partial lights outputting from the light outputting surface 11 of the first display panel 10 are shown in FIG. 5. The light c is deflected by the first lens 30 and the second lens 50 to enlarge an irradiation range.

In particular, the first sub-pixels 124 of the first display panel 10 form a first zoomed-in pixel region 124a on the second display panel 20 via the first lens 30. The first zoomed-in pixel area 124a has a first zoomed-in width $W_{13}$. Referring to FIG. 4 and FIG. 5, the first zoomed-in width $W_{13}$ is larger than a second sub-pixel width $W_{21}$, and the first zoomed-in width $W_{13}$ is smaller than a second pixel width $W_2$. With the design of enlarging the light irradiation range, the brightness change caused by the upper and lower light shielding layers can be eliminated, and generated interference patterns can be reduced to improve display quality.

As shown in FIG. 4, a first diameter $d_1$ is preferably smaller than the second sub-pixel width $W_{21}$, but a light irradiation range can be enlarged to be larger than the second sub-pixel width $W_{21}$ after the light c (refer to FIG. 5) corresponding to the region of each of the first sub-pixels 124 passes through the first lens 30. In addition, a second diameter $d_2$ is preferably larger than the second sub-pixel width $W_{21}$, and with the second lens 50 disposed on the second surface 62 of the second lens film 60, the light c is converged and then outputs from the second lens 50 to control the first zoomed-in width $W_{13}$. As shown in FIG. 5, when the light c reaches the second lens 50 after passing through the first lens 30, the irradiation range is enlarged, and the adjusted irradiation range is maintained after the light passes through the second lens 50. In other words, the second lens 50 can maintain the illumination range.

In an embodiment, the second lens 50 is a spherical lens, and its shape may be, for example, a very spherical surface or a similar spherical surface. A ratio of the second diameter $d_1$ to a height $h_2$ may be, but not limited to, 2:1. A distance between the first lens 30 and the second display panel 50 may be further used to adjust the light irradiation range. In other embodiments, there may be no interval 70B between the first lens 30 and the second display panel 50, and the light irradiation range is adjusted by adjusting a diameter-to-height ratio of the first lens 30.

Figure 6:
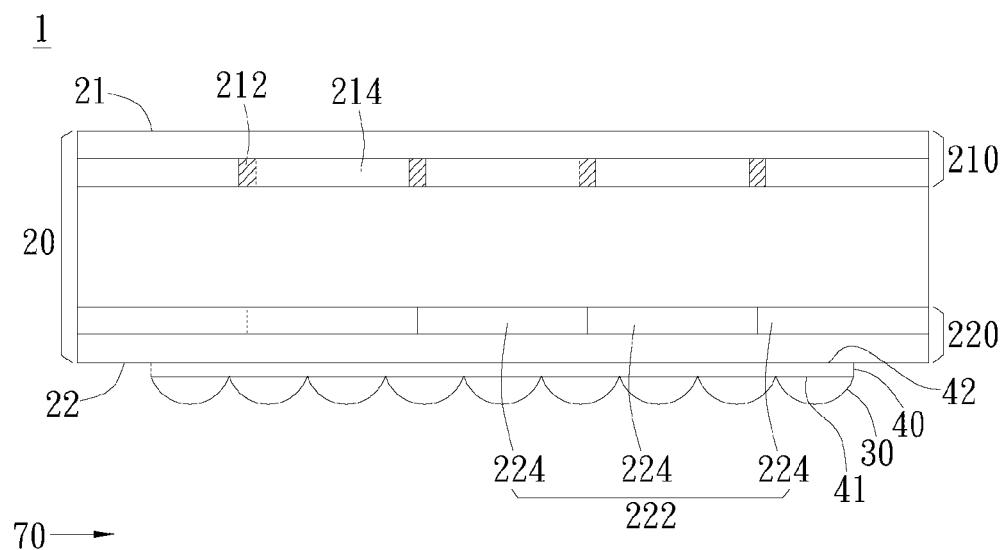
FIG. 6, FIG. 7, and FIG. 8 are schematic diagrams of different embodiments of disposing a first lens.
Figure 6:
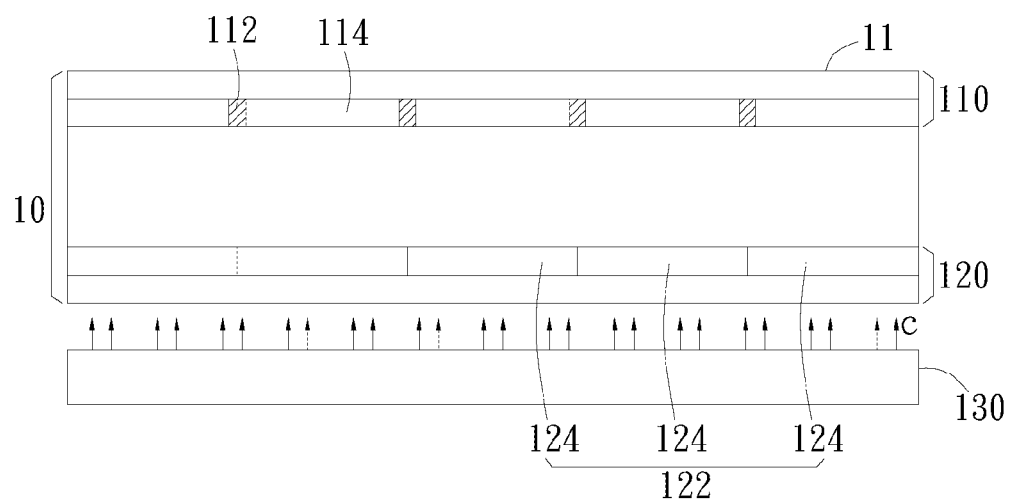

FIG. 6, FIG. 7, FIG. 8, and FIG. 9 are schematic diagrams of different embodiments of disposing the first lens 30. A position of the first lens 30 may be adjusted. As shown in FIG. 6, the second display panel 20 has a light outputting surface 21 and a light incident surface 22. The light incident surface 22 and the light outputting surface 21 are located on opposite sides of the second display panel 20, and the light incident surface 22 faces the light outputting surface 11 of the first display panel 10 (that is, the light incident surface 22 is closer to the light outputting surface 11 of the first display panel 10 than the light outputting surface 21 of the second display panel 20). The first lenses 30 are disposed on the light incident surface 22 of the second display panel 20. As shown in FIG. 6, the first lenses 30 are disposed on the first surface 41 of the first lens film 40, and the second surface 42 of the first lens film 40 is attached to the light incident surface 22 of the second display panel 20. As shown in FIG. 6, there is an interval 70 between the first display panel 10 and the first lens 30.

Figure 7:
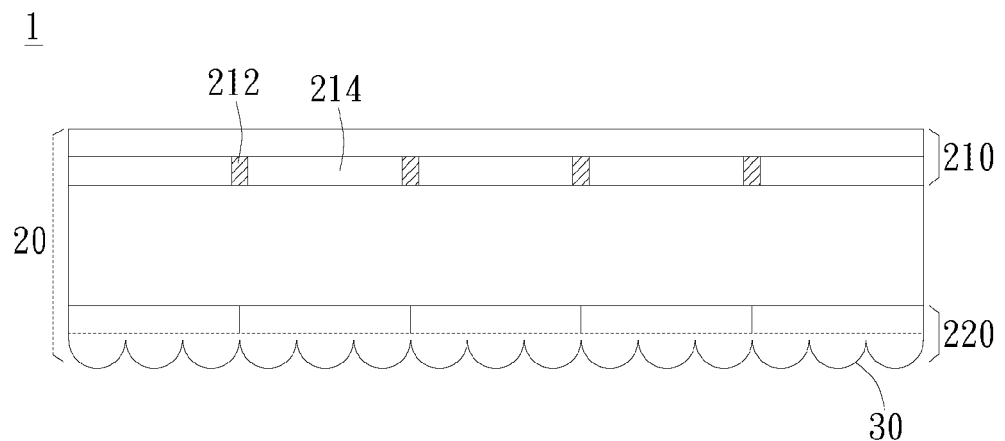
Figure 7:
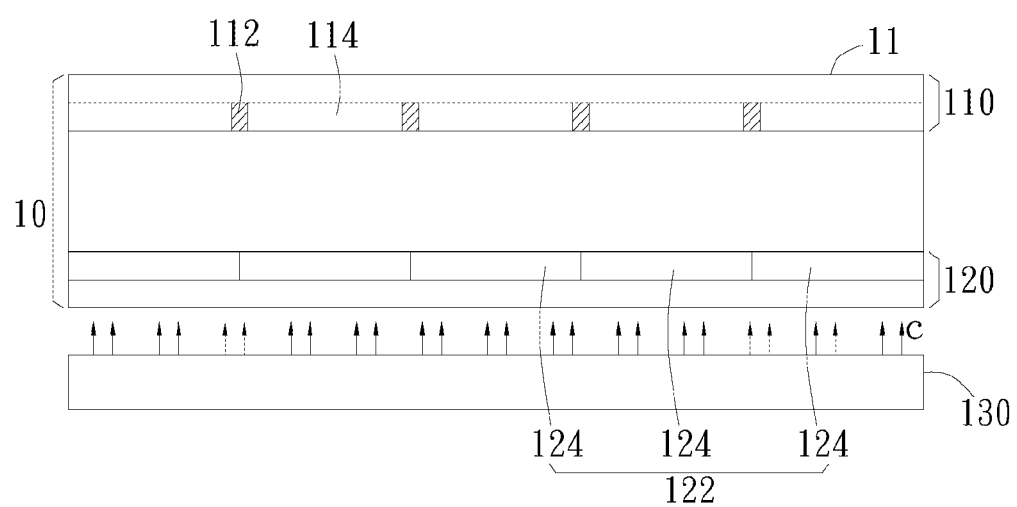

In FIG. 7, a position of the first lens 30 is adjusted to be disposed on the second display panel 20 directly. As shown in FIG. 7, the first display panel 10 includes a first substrate 110 and a second substrate 120, and the second display panel 20 includes a third substrate 210 and a fourth substrate 220. The fourth substrate 220 is closer to the light outputting surface 11 of the first display panel 10 than the third substrate 210. The first lens 30 is disposed on the fourth substrate 220. As shown in FIG. 7, the first lens 30 is disposed on one side of the fourth substrate 220 facing the light outputting surface 11 of the first display panel 10. As shown in FIG. 7, there is an interval 70 between the first display panel 10 and the first lens 30.

Figure 8:
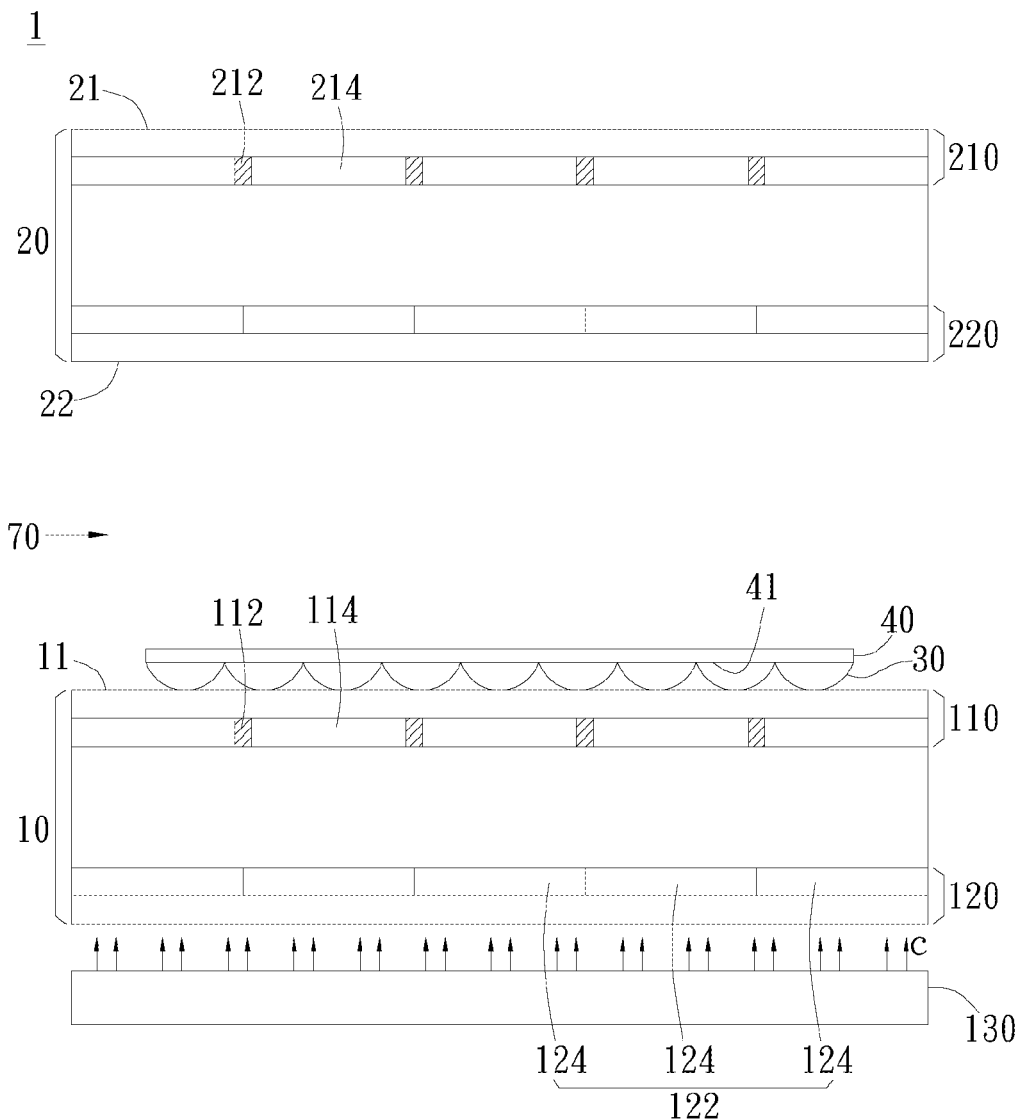

As shown in FIG. 8, the second display panel 20 has a light outputting surface 21 and a light incident surface 22. The light incident surface 22 and the light outputting surface 21 are located on opposite sides of the second display panel 20, and the light incident surface 22 faces the light outputting surface 11 of the first display panel 10 (that is, the light incident surface 22 is closer to the light outputting surface 11 of the first display panel 10 than the light emitting surface 21 of the second display panel 20). The first lenses 30 are disposed on the light outputting surface 11 of the first display panel 10. As shown in FIG. 8, the first lenses 30 are disposed on the first surface 41 of the first lens film 40, and one side of the first lens 30 opposite to the first surface 41 is attached to the light outputting surface 11 of the first display panel 10. As shown in FIG. 8, there is an interval 70 between the second display panel 20 and the first lens 30.

Figure 9:
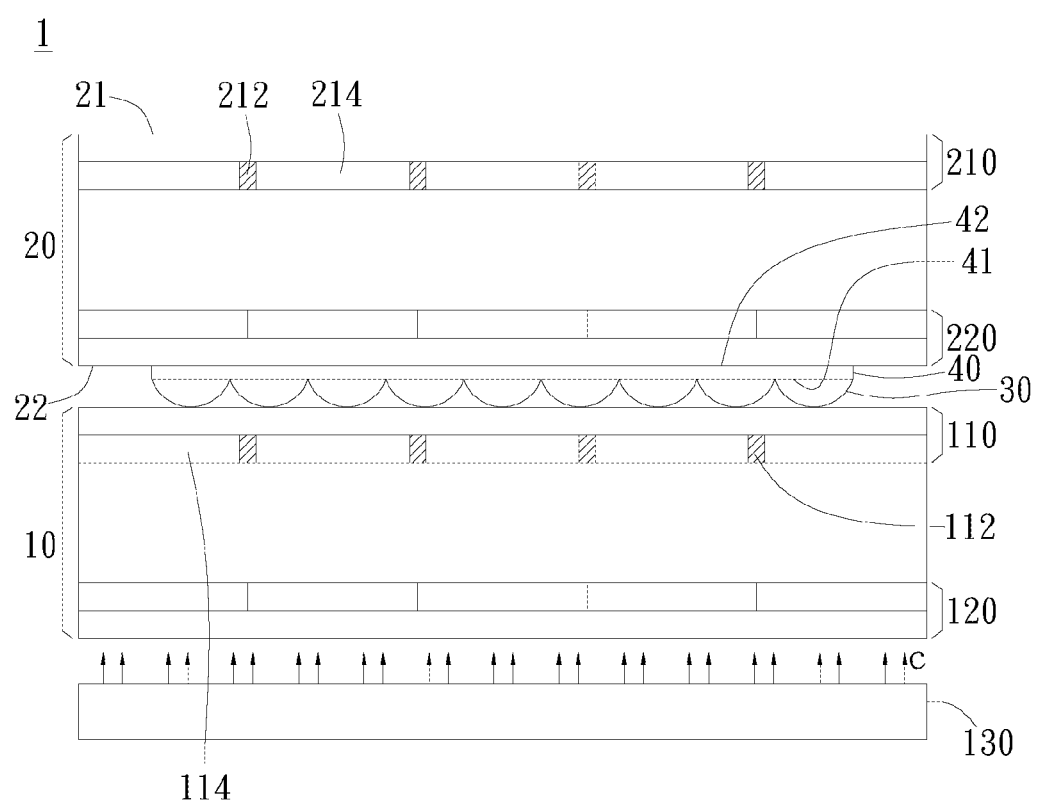
FIG. 9 is a schematic diagram of another embodiment of disposing a first lens.

As shown in FIG. 9, the second display panel 20 has a light outputting surface 21 and a light incident surface 22. The light incident surface 22 faces the light outputting surface 11 of the first display panel 10. The first lenses 30 are disposed between the first display panel 10 and the second display panel 20. As shown in FIG. 9, the first lenses 30 are disposed on the first surface 41 of the first lens film 40. One side of the first lens 30 opposite to the first surface 41 is attached to the light outputting surface 11 of the first display panel 10, and the second surface 42 of the first lens film 40 is attached to the light incident surface 22 of the second display panel 20. In the embodiment of FIG. 9, no interval is disposed between the first lens 30 and the first display panel 10 and between the first lens 30 and the second display panel 20.

Figure 8A:
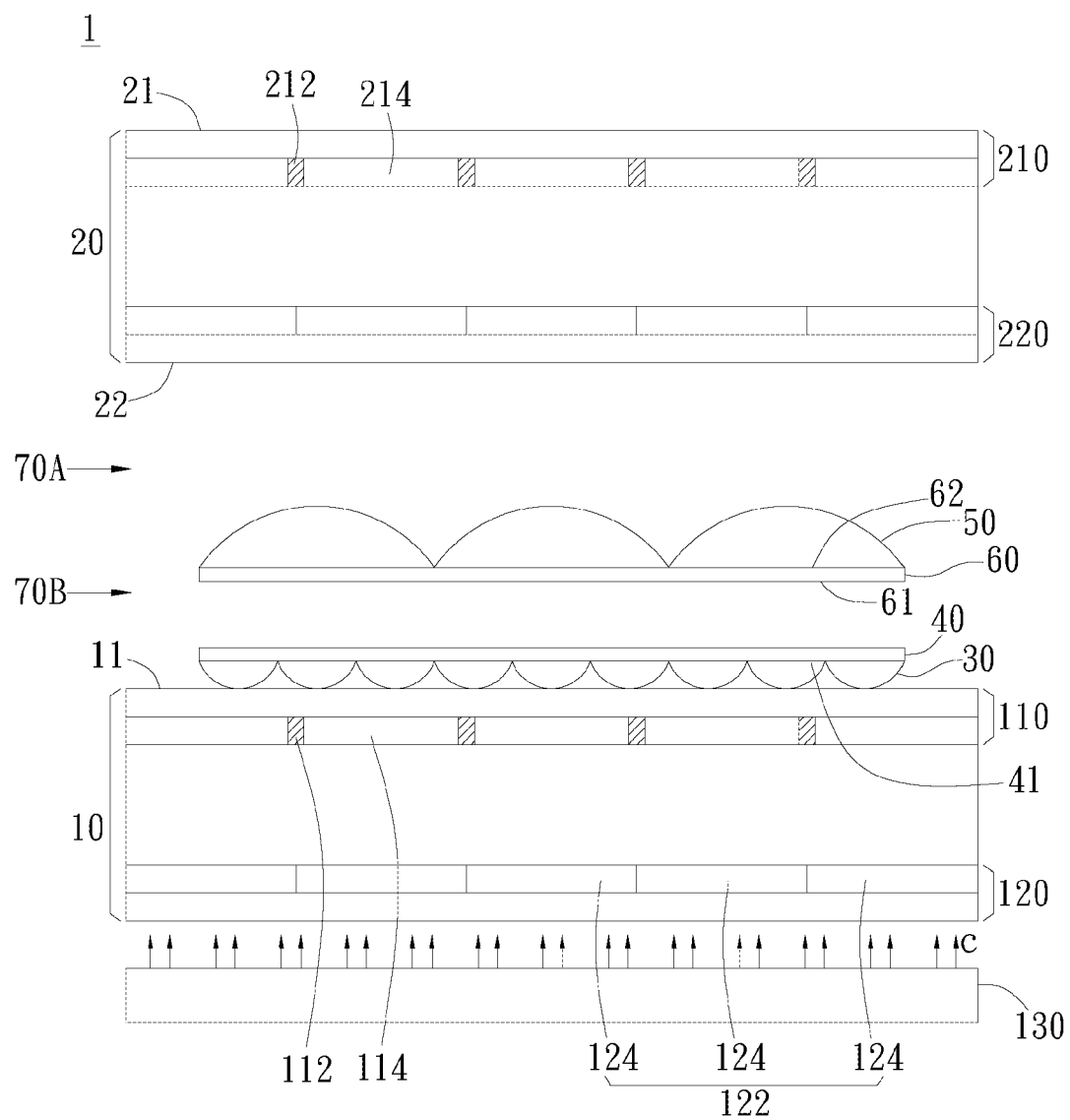
FIG. 8A is a schematic diagram of different embodiments of disposing a first lens and a second lens.

FIG. 8A is a schematic diagram of another embodiment in which the display device 1 has a second lens 50 disposed on second lens film 60. As shown in FIG. 8A, the first lens film 40 and the second lens film 60 are located between the first display panel 10 and the second display panel 20. The second lens film 60 is located between the first lens film 40 and the second display panel 20.

Figure 10:
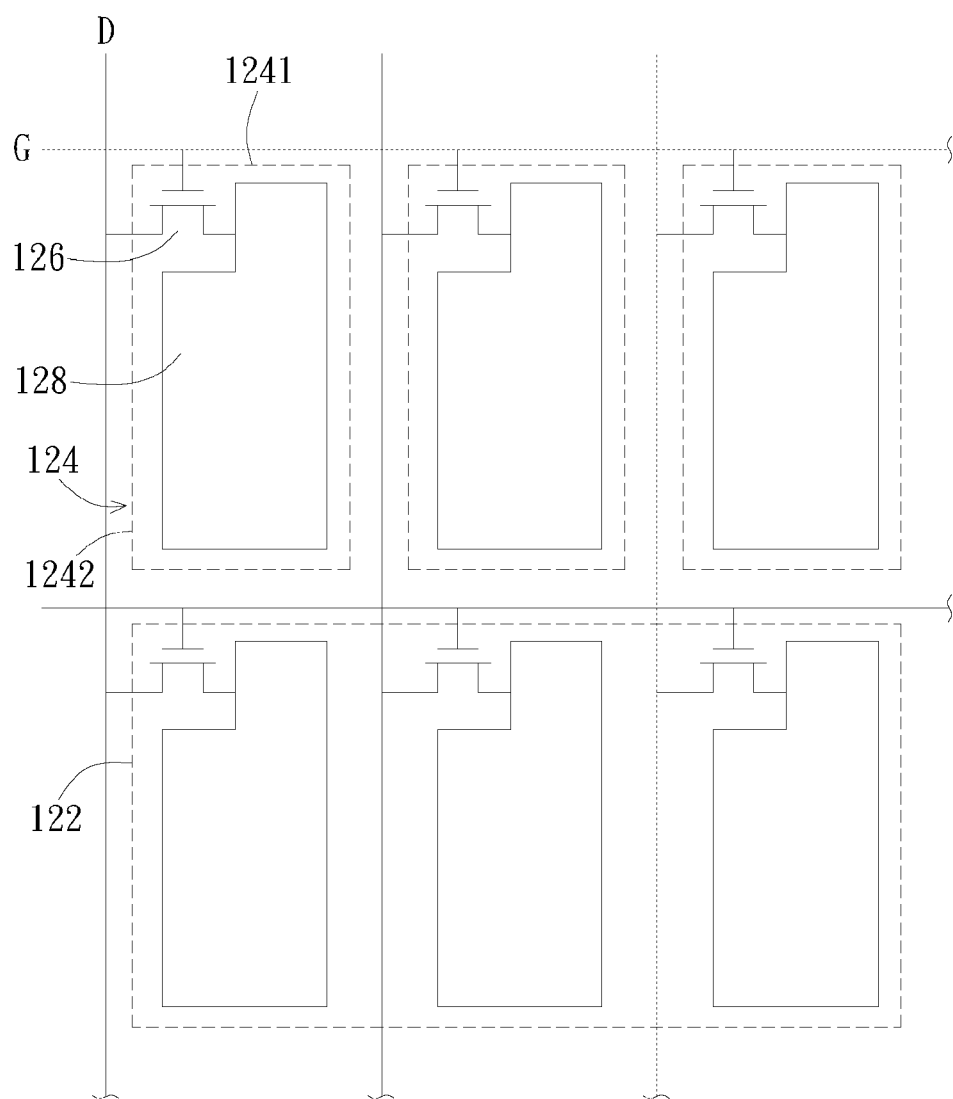
FIG. 10 is a schematic diagram of an embodiment of a pixel structure.

FIG. 10 is a schematic diagram of an embodiment of a pixel structure. The pixel structure is located in a first display panel and a second display panel. As shown in FIG. 10, the pixel structure is a rectangular or likely rectangular. A first sub-pixel 124 and a second sub-pixel may have pixel structures of a same shape and whose same side sizes and same distribution directions are the same, but the present invention is not limited thereto. The embodiment of FIG. 10 is an example in which the first sub-pixel 124 and the second sub-pixel have the same shape and have the side size and the same distribution direction. Therefore, only the first sub-pixel 124 is used as a representative for illustration.

As shown in FIG. 10, the pixel structure includes a plurality of first sub-pixels 124 disposed in the first display panel, the plurality of first sub-pixels 124 (ex. at least three sub-pixels of the first sub-pixels 124) constituting a first pixel 122. Each of the first sub-pixels 124 has a first side 1241 and a second side 1242 connected to the first side 1241. Each of the first sub-pixels 124 has a transistor 126 connected to a data line D, a scanning line G, and a pixel electrode 128.

When the first sub-pixel and the second sub-pixel have pixel structure of the same shape and whose side sizes and distribution directions are the same, the foregoing display device having a first lens and/or a second lens in FIG. 1 to FIG. 9 (or related variations mentioned in corresponding paragraphs) may be used to reduce interference patterns generated when the first display panel and the second display panel are not completely aligned, thereby improving display quality.

Figure 11A:
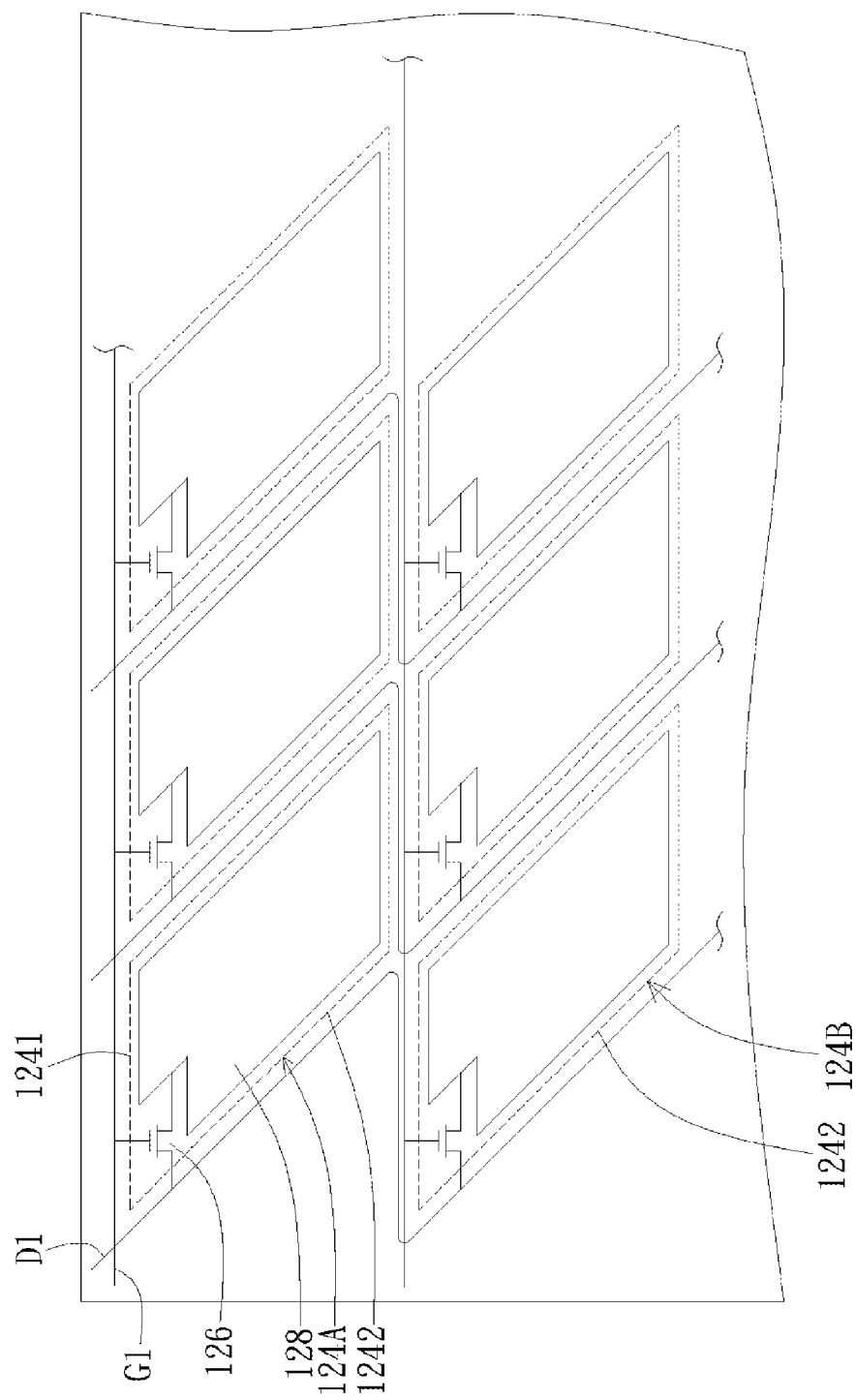
FIG. 11A and FIG. 11B are schematic diagrams of another embodiment of a pixel structure.
Figure 11B:
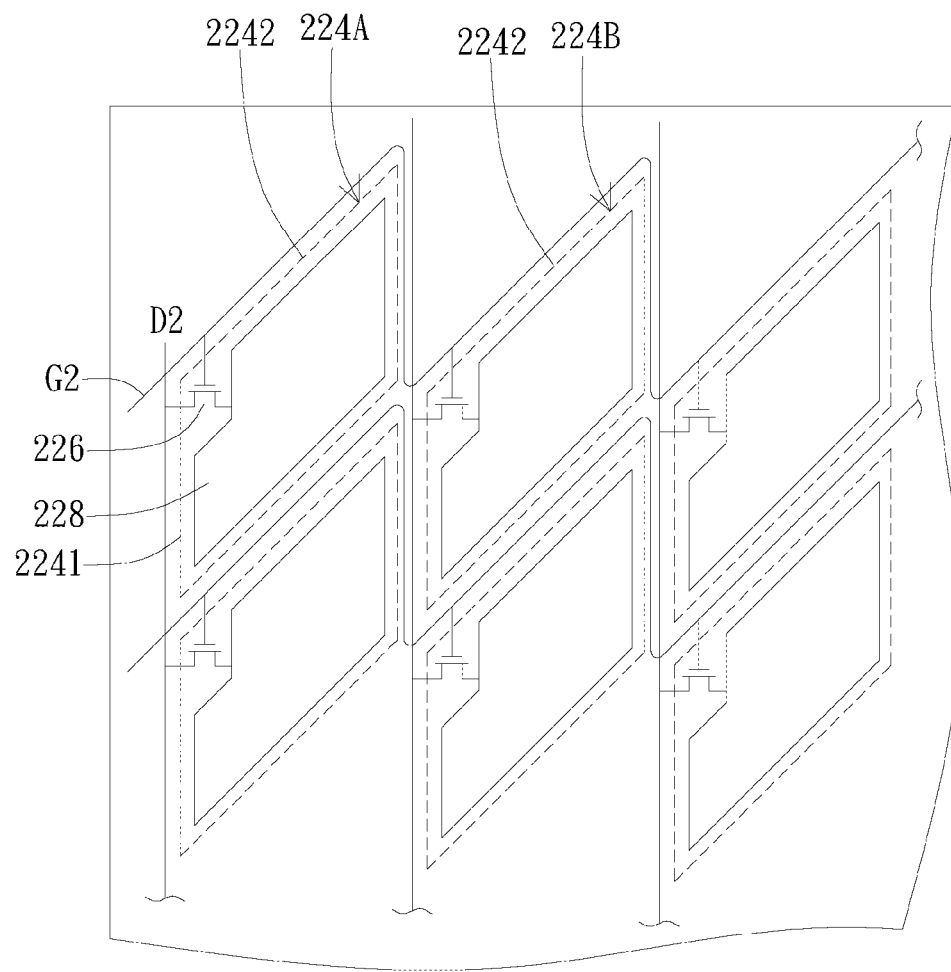

FIG. 11A and FIG. 11B are schematic diagrams of another embodiment of a pixel structure. Pixel structures in FIG. 11A and FIG. 11B are respectively located in a first display panel and a second display panel, and include a plurality of first sub-pixels (such as 124A and 124B) and a plurality of second sub-pixels (such as 224A and 224B). In this embodiment, FIG. 11A illustrates a first sub-pixel disposed in the first display panel and a trace corresponding to the first sub-pixel, and FIG. 11B illustrates a second sub-pixel disposed in the second display panel and a trace corresponding to the second sub-pixel, but the present invention is not limited thereto. In another embodiment, FIG. 11A may also be a pixel structure of the second display panel, and FIG. 11B is a pixel structure of the first display panel.

As shown in FIG. 11A, each of the first sub-pixels 124A has a first side 1241 and a second side 1242 connected to the first side 1241. Each of the first sub-pixels has a transistor 126 connected to a first data line D1, a first scanning line G1, and a pixel electrode 128. The first side 1241 and the second side 1242 may be, for example, determined based on an edge surrounding the pixel electrode 128, or may be determined based on distribution positions of the data line D1 and the scanning line G1. Positions of the first side 1241 and the second side 1242 preferably correspond to a projection range of a light filter layer 114. The first scanning line G1 and the first data line D1 are distributed along the first side 1241 and the second side 1242 respectively. As shown in FIG. 11B, each of the second sub-pixels 224A has a third side 2241 and a fourth side 2242 connected to the third side 2241. Each of the second sub-pixels has a transistor 226 connected to a second data line D2, a second scanning line G2, and a pixel electrode 228. The second data line D2 and the second scanning line G2 are distributed along the third side 2241 and the forth side 2242 respectively.

In general, all of the first sub-pixels and the second sub-pixels are not rectangular. As shown in FIG. 11A and FIG. 11B, the first sub-pixels 124A and the second sub-pixels 224A have a shape like a parallelogram. The first sub-pixels 124A and the second sub-pixels 224A form different parallelograms, that is, side distribution directions are different. As shown in FIG. 11A and FIG. 11B, the first side 1241, the second side 1242, the third side 2241, and the fourth side 2242 are not parallel to each other. For example, the first side 1241 and the second side 1242 are adjacent sides of the parallelogram formed by the first sub-pixels 124A, and are not parallel. The first side 1241 and the third side 2241 are perpendicular to each other. The first side 1241 and the fourth side 2242 are also not parallel. The second side 1242 and the third side 2241 are not parallel, and the second side 1242 and the fourth side 2242 are not parallel. Since the first side 1241, the second side 1242, the third side 2241, and the fourth side 2242 are not parallel to each other, the first scanning line G1, the second scanning line G2, the first data line D1, and the second data Lines D2 are not parallel to each other.

Figure 12:
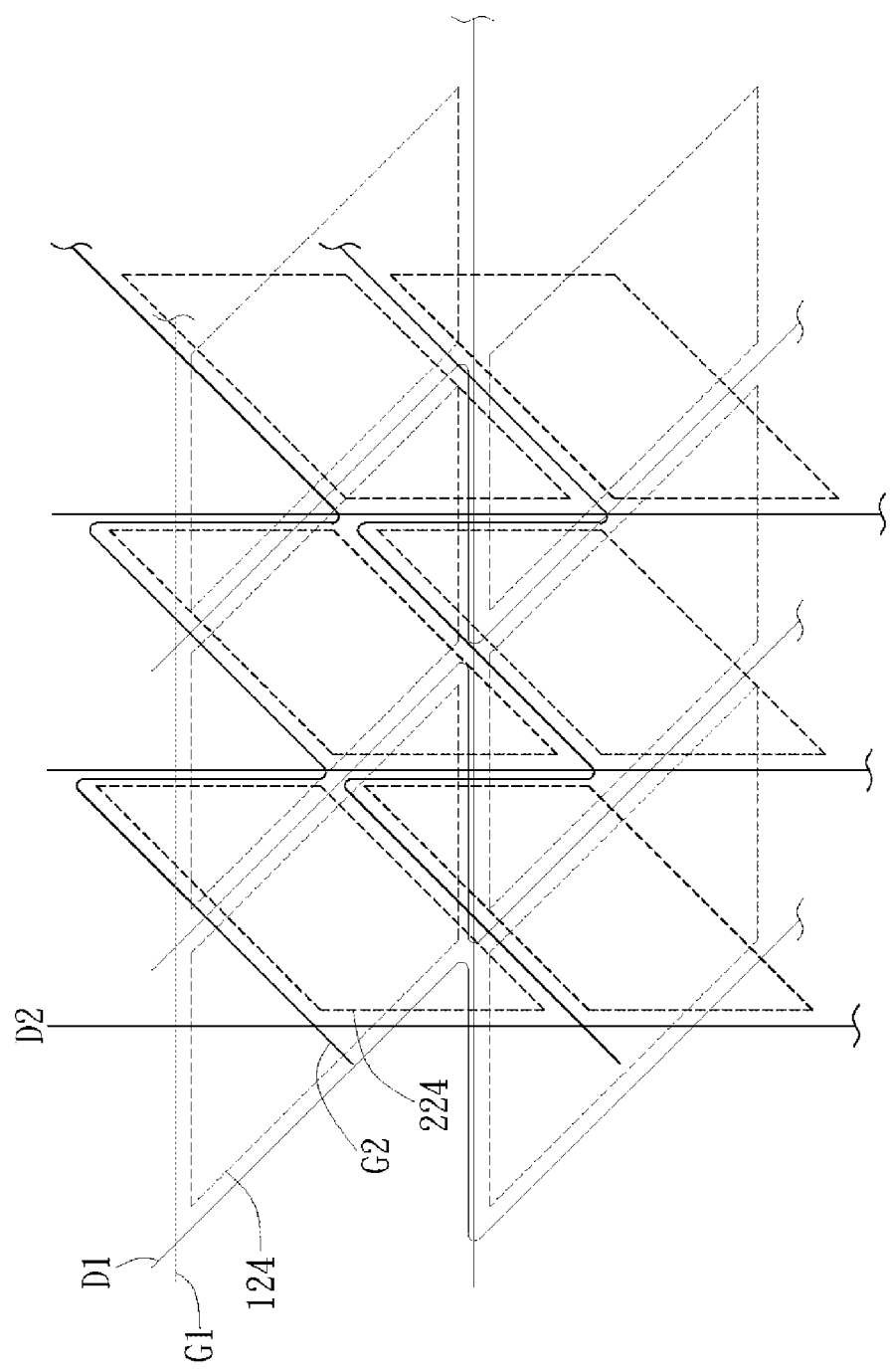
FIG. 12 is a schematic diagram in which a second pixel is stacked on a first pixel.

FIG. 12 is a schematic diagram in which a second pixel is stacked on a first pixel. For ease of description, specific structures such as a transistor or a pixel electrode in the first sub-pixel and the second sub-pixel are omitted in the figure, and only boundaries of the sub-pixels and traces corresponding to side distribution are shown. As shown in FIG. 12, the first scanning line G1 extends in a straight line direction and is not parallel to the meandering second scanning line G2. The second data line D2 extends in another straight line direction and is not parallel to the meandering first data line D1. In the design in which the sides of the first sub-pixel 124 and the sides of the second sub-pixel 224 are not parallel, parallel portions of traces distributed along the sides are reduced, and preferably, the entire traces are not parallel to each other. In this way, parallel traces are prevented from mistakenly generating regular interference pattern, thereby reducing generated interference patterns.

Figure 13A:
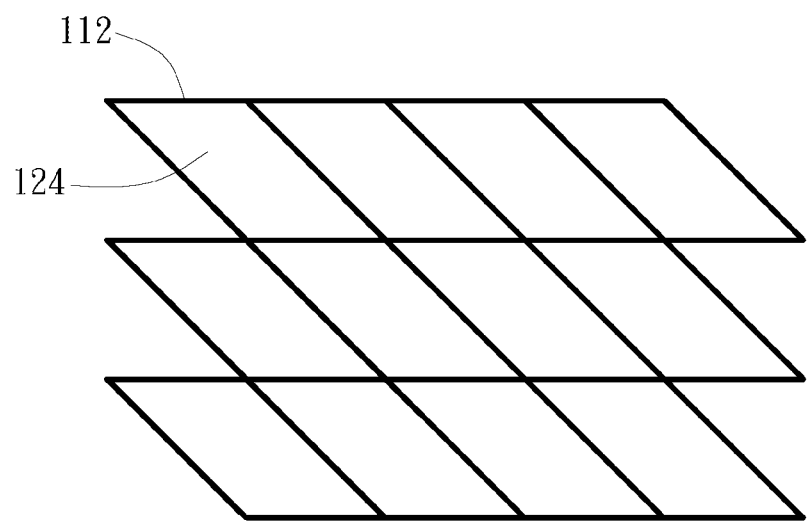
FIG. 13A and FIG. 13B are schematic diagrams of another embodiment of a pixel structure.
Figure 13B:
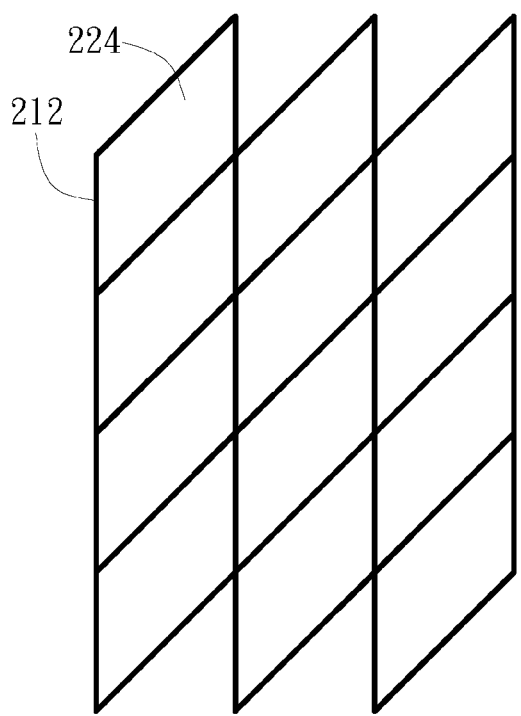

FIG. 13A and FIG. 13B are schematic diagrams of another embodiment of a pixel structure. FIG. 13A and FIG. 13B are examples showing a view in a direction a in FIG. 1. As shown in FIG. 13A, there is a light shielding layer 112 around the first sub-pixels 124. As shown in FIG. 13B, there is a light shielding layer 212 around the second sub-pixels 224.

Figure 13C:
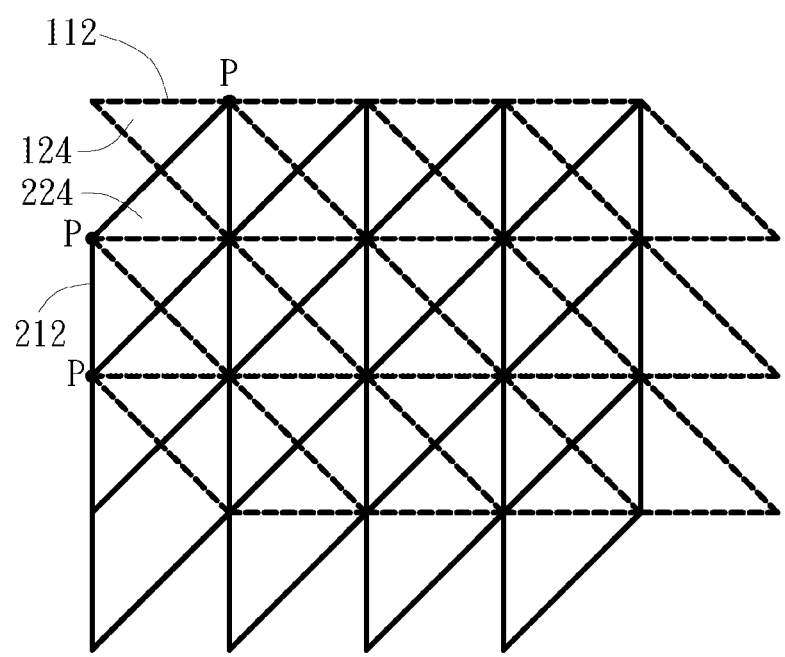
FIG. 13C is a schematic diagram in which a second pixel is stacked on a first pixel.

FIG. 13C is a schematic diagram in which a second pixel is stacked on a first pixel. As shown in FIG. 13C, the first sub-pixels 124 and the second sub-pixels 224 are disposed in an overlay manner. For ease of identification, an appearance of the first sub-pixels 124 is indicated using dashed lines. Preferably, end points P of the two types of sub-pixels roughly overlap.

For a relationship of sides of sub-pixels, refer to FIG. 14A to FIG. 14C. FIG. 14A to FIG. 14C are schematic diagrams of correspondences between sides of first sub-pixels and sides of second sub-pixels. As shown in FIG. 14A, the first side 1241 of the first sub-pixel 124A is located on a first straight line L1 (or parallel to the first straight line L1) substantially, and as shown in FIG. 14B, the third side 2241 of the second sub-pixel 224A is located on a second line L2 (or parallel to the second line L2) substantially.

Similarly, first sides 1241 of a first sub-pixel 124B, a first sub-pixel 124C, and a first sub-pixel 124D are parallel to the first straight line L1. In FIG. 14B, third sides 2241 of a second sub-pixel 224B, a second sub-pixel 224C, and a second sub-pixel 224D are parallel to the first straight line L2. The foregoing first scanning line G1 (refer to FIG. 11A) roughly extends in parallel to the first straight line L1, and the second data line D2 (refer to FIG. 11B) roughly extends along the second straight line L2. Orthographic projections of the first straight line L1 and the second straight line L2 on the first display panel are perpendicular. In other words, when viewed in the direction a in FIG. 1, the first straight line L1 is perpendicular to the second straight line L2.

In addition, as shown in FIG. 14A, the second side of each of the first sub-pixels has two end points. For example, the second side 1242 of the first sub-pixel 124A has an end point P11 and an end point P12, and the second side 1242 of the first sub-pixel 124B has an end point P13 and an end point P14. The end point P11 and the end point P13 are located on a third straight line L3 substantially. The end point P12 and the end point P14 are located on a fourth straight line L4 substantially. The third straight line L3 and the fourth straight line L4 do not overlap. In the extending direction parallel to the second straight line L2, a line between same corresponding end points (for example, P11 and P13) of the second sides 1242 and a line between other corresponding end points (for example, P12 and P14) are not in one straight line. Therefore, the second side 1242 and the third side 2241 are not parallel, and the first data line D1 distributed along the second side 1242 and the second data line D2 distributed along the third side 2241 (refer to FIG. 11A and FIG. 11B) are not parallel.

On the other hand, the fourth side of each of the second sub-pixels has two end points. For example, the fourth side 2242 of the second sub-pixel 224A has an end point P21 and an end point P22, and the fourth side 2242 of the second sub-pixel 224B has an end point P23 and an end point P24. The end point P21 and the end point P23 are located on a fifth straight line L5 substantially. The end point P22 and the end point P24 are located on a sixth straight line L6 substantially. The fifth straight line L5 and the sixth straight line L6 do not overlap. In the extending direction parallel to the first straight line L1, a line between same corresponding end points (for example, P21 and P23) of the fourth sides 2242 and a line between other corresponding end points (for example, P22 and P24) are not in one straight line. Therefore, the first side 1241 and the fourth side 2242 are not parallel, and the first scanning line G1 distributed along the first side 1241 and the second scanning line G2 distributed along the fourth side 2242 (refer to FIG. 11A and FIG. 11B) are not parallel.

As shown in FIG. 14C, there is an angle θ between orthographic projections of the first side 1241 of the first sub-pixel 124 and the fourth side 2242 of the second sub-pixel 224 on the first display panel. In one embodiment, the angle θ is in a range of 45 degrees to 90 degrees to enhance an effect of suppressing interference patterns.

It should be noted that, when shapes of the first sub-pixel and the second sub-pixel are the foregoing pixel structure in which sides are not parallel to each other, the display device having a first lens and/or a second lens may not be used, and generated interference patterns caused from mutual interference between traces are reduced merely by adjusting trace distribution of a scanning line and a data line, thereby improving display quality. However, in other embodiments, the first lens and/or the second lens may still be used additionally to further improve the display quality.

It should be understood that the first sub-pixel and the second sub-pixel are not limited to being non-rectangular. The shapes of the first sub-pixel and the second sub-pixel may be adjusted to other pixel structures in which the side of the first sub-pixel and the side of the second sub-pixel are not parallel to each other. For example, the first sub-pixel and the second sub-pixel are non-rectangular, or one is rectangle and the other is non-rectangular.

Figure 15A:
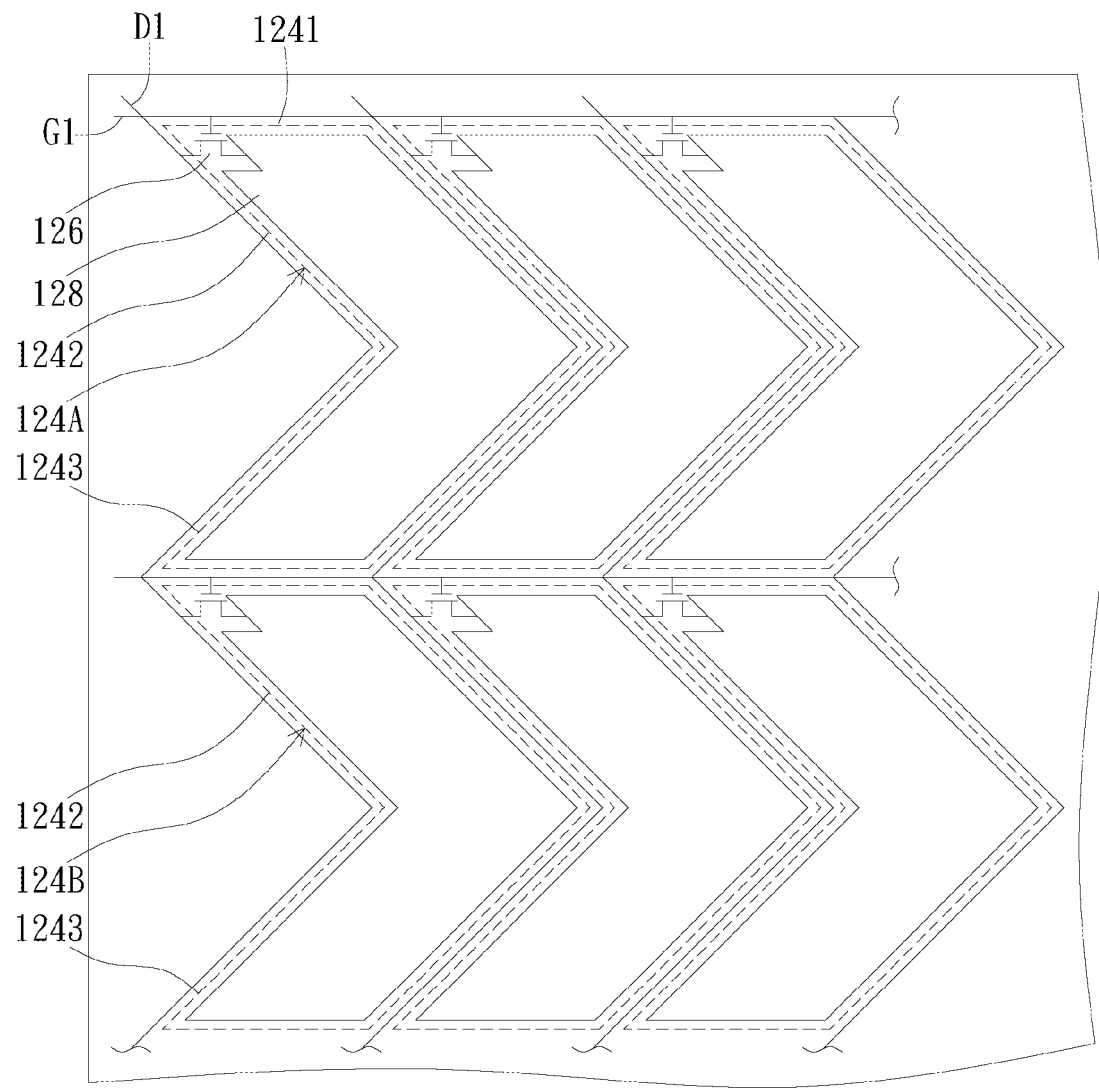
FIG. 15A and FIG. 15B are schematic diagrams of another embodiment of a pixel structure.
Figure 15B:
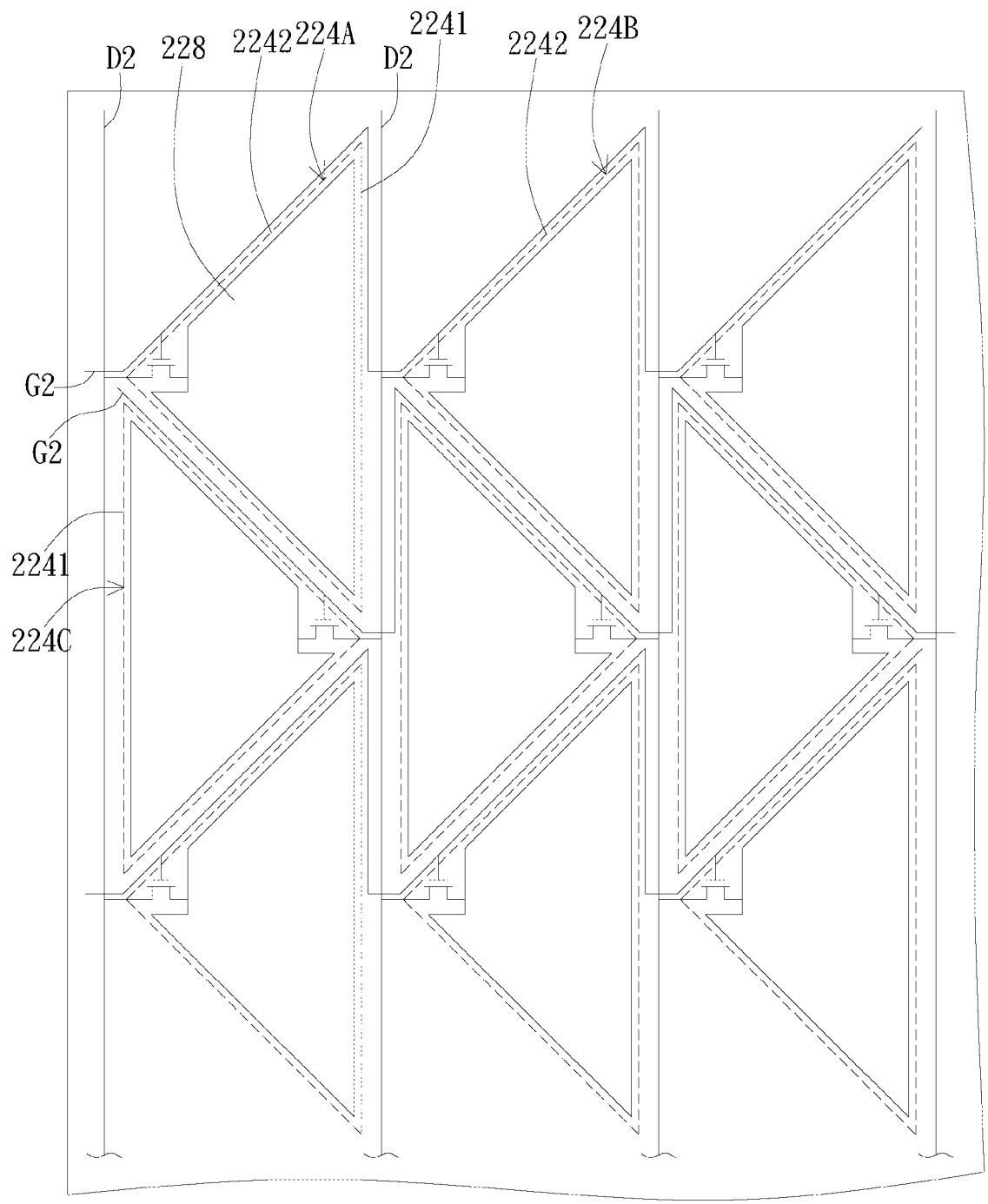

FIG. 15A and FIG. 15B are schematic diagrams of another embodiment of a pixel structure. Pixel structures in FIG. 15A and FIG. 15B are respectively located in a first display panel and a second display panel, and include a plurality of first sub-pixels and a plurality of second sub-pixels. In this embodiment, FIG. 15A illustrates a first sub-pixel 124A disposed in the first display panel and a trace corresponding to the first sub-pixel 124A, and FIG. 15B illustrates a second sub-pixel 224A disposed in the second display panel and a trace corresponding to the second sub-pixel 224A, but the present invention is not limited thereto. In another embodiment, FIG. 15A may also be a pixel structure of the second display panel, and FIG. 15B is a pixel structure of the first display panel.

As shown in FIG. 15A, each of the first sub-pixels 124A has a first side 1241 and a second side 1242 connected to the first side 1241. The other end of the second side 1242 connected to the first side 1241 is connected to a side 1243. Each of the first sub-pixels has a transistor 126 connected to a first data line D1, a first scanning line G1, and a pixel electrode 128. The first scanning line G1 is distributed along the first side 1241. The first data line D1 is distributed along the second side 1242 and the side 1243 of the first sub-pixel 124A, and then distributed along a second side 1242 of a first sub-pixel 124B.

As shown in FIG. 15B, each of the second sub-pixels 224A has a third side 2241 and a fourth side 2242 connected to the third side 2241. Each of the second sub-pixels has a transistor 226 connected to a second data line D2, a second scanning line G2, and a pixel electrode 228. The second data line D2 and the second scanning line G2 are distributed along the third side 2241 and the forth side 2242 respectively. For example, the second data line D2 is distributed along the third side 2241 of the second sub-pixel 224C. The second scanning line G2 is distributed along the fourth side 2242 of the second sub-pixel 224A, and then along a fourth side 2242 of a second sub-pixel 224B.

In general, all of the first sub-pixels and the second sub-pixels are not rectangular. As shown in FIG. 15A, the first sub-pixels 124A form a V-shaped concave hexagon, and as shown in FIG. 15B, the second sub-pixels 224A are a triangle. The first sub-pixels 124A and the second sub-pixels 224A form different shapes, and side distribution directions are different. As shown in FIG. 15A and FIG. 15B, the first side 1241, the second side 1242, the third side 2241, and the fourth side 2242 are not parallel to each other. For example, the first side 1241 and the second side 1242 are adjacent sides of the concave hexagon formed by the first sub-pixels 124A, and are not parallel. The first side 1241 and the third side 2241 are perpendicular to each other. The first side 1241 and the fourth side 2242 are also not parallel. The second side 1242 and the third side 2241 are not parallel, and the second side 1242 and the fourth side 2242 are not parallel. Since the first side 1241, the second side 1242, the third side 2241, and the fourth side 2242 are not parallel to each other, the first scanning line G1, the second scanning line G2, the first data line D1, and the second data Lines D2 are not parallel to each other.

Figure 16:
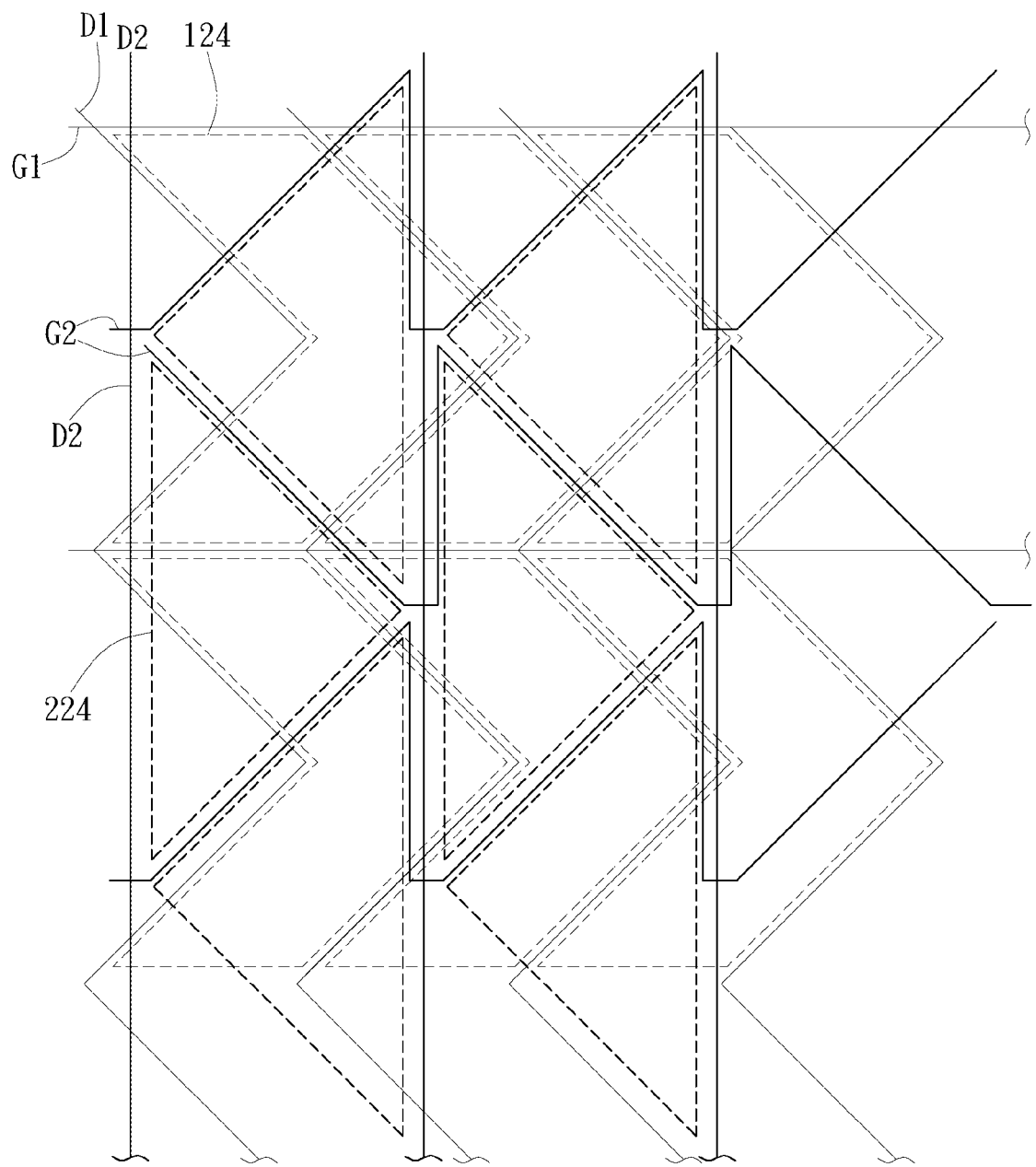
FIG. 16 is a schematic diagram in which a second pixel is stacked on a first pixel.

FIG. 16 is a schematic diagram in which a second pixel is stacked on a first pixel. For ease of description, specific structures such as a transistor or a pixel electrode in the first sub-pixel 124 and the second sub-pixel 224 are omitted in the figure, and only boundaries of the sub-pixels and traces corresponding to side distribution are shown. As shown in FIG. 16, the first scanning line G1 extends in a straight line direction and is not parallel to the meandering second scanning line G2. The second data line D2 extends in another straight line direction and is not parallel to the meandering first data line D1. In the design in which the sides of the first sub-pixel 124 and the sides of the second sub-pixel 224 are not parallel, parallel portions of traces distributed along the sides are reduced, and preferably, the entire traces are not parallel to each other, thereby reducing generated interference patterns.

Figure 17A:
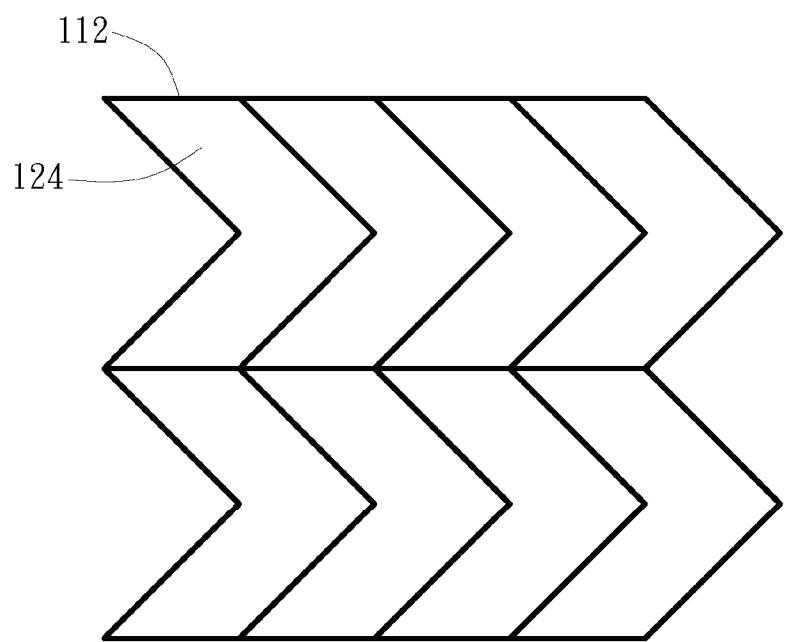
FIG. 17A and FIG. 17B are schematic diagrams of another embodiment of a pixel structure.
Figure 17B:
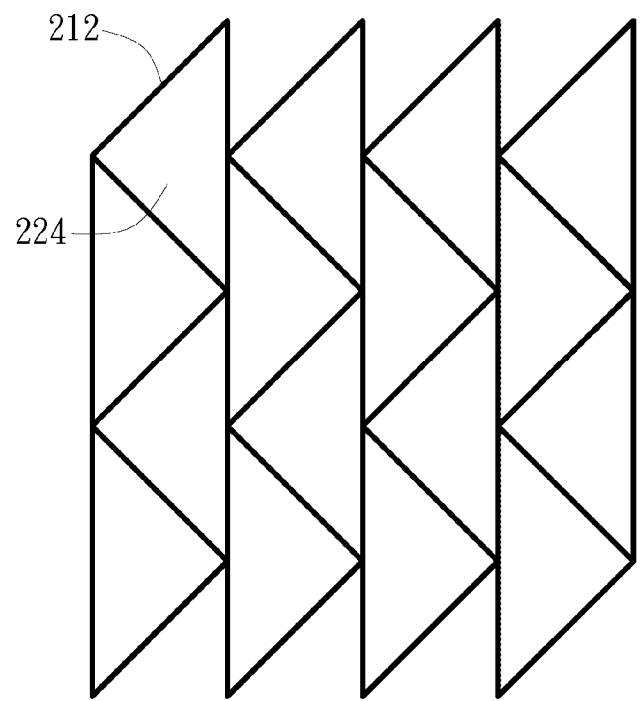

FIG. 17A and FIG. 17B are schematic diagrams of another embodiment of a pixel structure. FIG. 17A and FIG. 17B are examples showing a view in a direction a in FIG. 1. As shown in FIG. 17A, there is a light shielding layer 112 around the first sub-pixels 124. As shown in FIG. 17B, there is a light shielding layer 212 around the second sub-pixels 224.

Figure 17C:
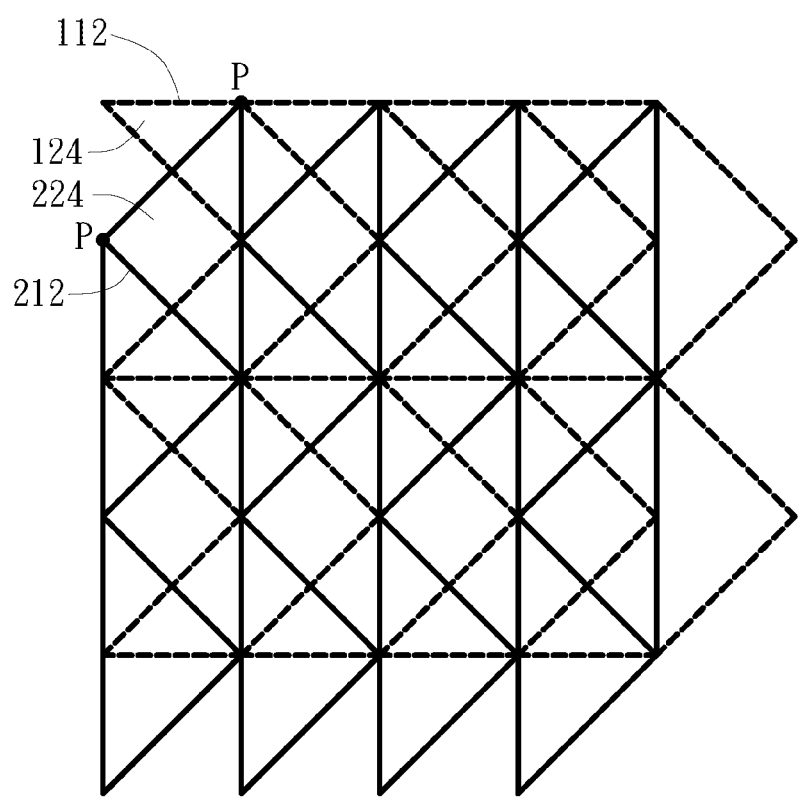
FIG. 17C is a schematic diagram in which a second pixel is stacked on a first pixel.

FIG. 17C is a schematic diagram in which a second pixel is stacked on a first pixel. As shown in FIG. 17C, the first sub-pixels 124 and the second sub-pixels 224 are disposed in an overlay manner. For ease of identification, an appearance of the first sub-pixels 124 is indicated using dashed lines. Preferably, end points P of the two types of sub-pixels roughly overlap.

Figure 18A:
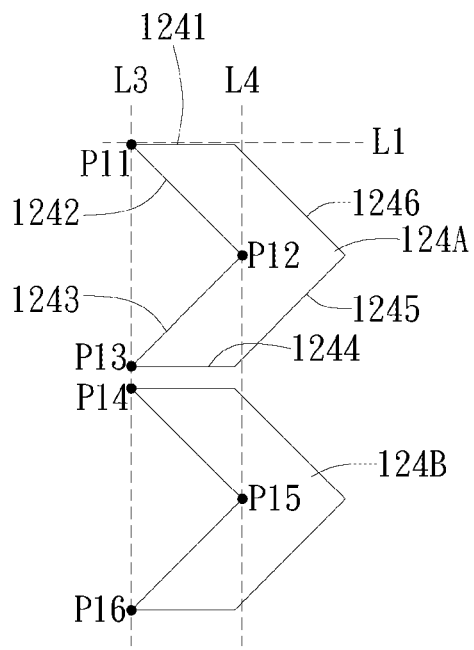
FIG. 18A to FIG. 18C are schematic diagrams of correspondences between sides of first sub-pixels and sides of second sub-pixels.
Figure 18B:
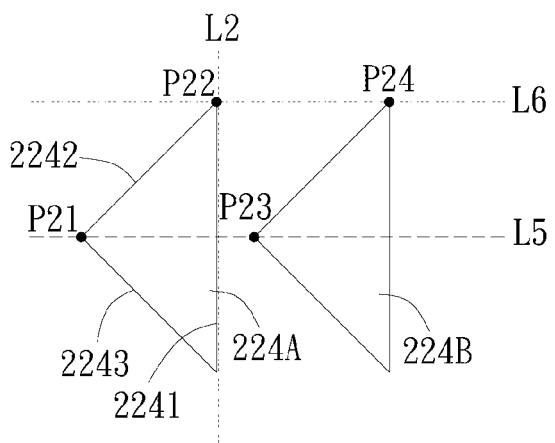
Figure 18C:
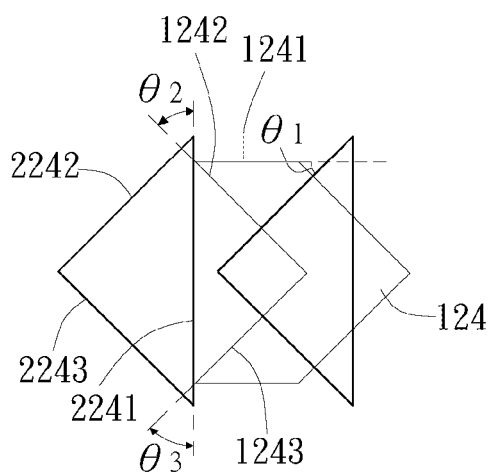

For a relationship of sides of the sub-pixels, refer to FIG. 18A to FIG. 18C. FIG. 18A to FIG. 18C are schematic diagrams of correspondences between sides of first sub-pixels and sides of second sub-pixels. As shown in FIG. 18A, the first side 1241 of the first sub-pixel 124A is located on a first straight line L1 (or parallel to the first straight line L1) substantially, and as shown in FIG. 18B, the third side 2241 of the second sub-pixel 224A is located on a second line L2 (or parallel to the second line L2) substantially. The foregoing first scanning line G1 (refer to FIG. 15A) roughly extends in parallel to the first straight line L1, and the second data line D2 (refer to FIG. 15B) roughly extends along the second straight line L2. Orthographic projections of the first straight line L1 and the second straight line L2 on the first display panel are perpendicular. In other words, when viewed in the direction a in FIG. 1, the first straight line L1 is perpendicular to the second straight line L2.

In addition, as shown in FIG. 18A, the second side of each of the first sub-pixels has two end points. For example, the second side 1242 of the first sub-pixel 124A has an end point P11 and an end point P12, and the second side 1242 of the first sub-pixel 124B has an end point P14 and an end point P15. The end point P11 and the end point P14 are located on a third straight line L3 substantially. The end point P12 and the end point P15 are located on a fourth straight line L4 substantially. The third straight line L3 and the fourth straight line L4 do not overlap. In the extending direction parallel to the second straight line L2, a line between same corresponding end points (for example, P11 and P14) of the second sides 1242 and a line between other corresponding end points (for example, P12 and P15) are not in one straight line. Therefore, the second side 1242 and the third side 2241 are not parallel, and the first data line D1 along the second side 1242 and the second data line D2 along the third side 2241 (refer to FIG. 15A and FIG. 15B) are not parallel. Similarly, a side 1246 parallel to the second side 1242 is also not parallel to the third side 2241.

Further, other sides along which a data line in the first pixels is distributed are also not parallel to the third side 2241 are also not parallel. As shown in FIG. 18A, a side 1243 of each of the first sub-pixels has two end points. For example, the side 1243 of the first sub-pixel 124A has an end point P12 and an end point P13, and a side 1243 of the first sub-pixel 124B has an end point P15 and an end point P16. As described above, the end point P12 and the end point P15 are located on a fourth straight line substantially. In addition, the end point P13 and the end point P16 are located on a third straight line L3 substantially. The third straight line L3 and the fourth straight line L4 do not overlap. In the extending direction parallel to the second straight line L2, a line between same corresponding end points (for example, P13 and P16) of the sides 1243 and a line between other corresponding end points (for example, P12 and P15) are not in one straight line. Therefore, the side 1243 and the third side 2241 are not parallel, and the first data line D1 distributed along the side 1243 and the second data line D2 distributed along the third side 2241 (refer to FIG. 15A and FIG. 15B) are not parallel. Similarly, a side 1245 parallel to the side 1243 is also not parallel to the third side 2241.

On the other hand, the fourth side 2242 of each of the second sub-pixels has two end points. For example, the fourth side 2242 of the second sub-pixel 224A has an end point P21 and an end point P22, and the fourth side 2242 of the second sub-pixel 224B has an end point P23 and an end point P24. The end point P21 and the end point P23 are located on a fifth straight line L5 substantially. The end point P22 and the end point P24 are located on a sixth straight line L6 substantially. The fifth straight line L5 and the sixth straight line L6 do not overlap. In the extending direction parallel to the first straight line L1, a line between same corresponding end points (for example, P21 and P23) of the fourth sides 2242 and a line between other corresponding end points (for example, P22 and P24) are not in one straight line. Therefore, the first side 1241 and the fourth side 2242 are not parallel, and the first scanning line G1 distributed along the first side 1241 and the second scanning line G2 distributed along the fourth side 2242 (refer to FIG. 15A and FIG. 15B) are not parallel.

Furthermore, other sides of the first sub-pixel are preferably not parallel to sides of the second sub-pixel on corresponding positions in an orthographic projection direction. For example, for a side 1244 of the first sub-pixel 124A parallel to the side 1241, a position of the side 1244 corresponds to a side 2243 of the second sub-pixel 224A substantially Similar to a case of the fourth side 2242 discussed in the previous paragraph, in the extending direction parallel to the first straight line L1, since a line between corresponding same end points of the sides 2243 and a line between other corresponding end points are not in one straight line, the side 1244 and the side 2243 are not parallel.

As shown in FIG. 18C, for sides along which a scanning line is distributed, there is an angle $\theta_1$ between orthographic projections of the first side 1241 of the first sub-pixel 124 and the fourth side 2242 of the second sub-pixel 224 on the first display panel. For sides along which a data line is distributed, there is an angle $\theta_2$ between orthographic projections of the second side 1242 of the first sub-pixel 124 and the third side 2241 of the second sub-pixel 224 on the first display panel. In addition, there is an angle $\theta_3$ between orthographic projections of the side 1243 of the first sub-pixel 124 and the third side 2241 of the second sub-pixel 224 on the first display panel. In one embodiment, the angles $\theta_1$, $\theta_2$, and $\theta_3$ are in a range of 45 degrees to 90 degrees to enhance an effect of suppressing interference patterns.

Further, each side of the first sub-pixel 124 and each side of the second sub-pixel 224 are not parallel to each other, and an angle between the side of the first sub-pixel 124 and a side of the second sub-pixel 224 on a corresponding position in an orthogonal projection direction is preferably in the foregoing range from 45 degrees to 90 degrees, to further enhance the effect of suppressing interference patterns. In addition, display quality may be further improved using a first lens and/or a second lens.

In the following Table 1, degrees of interference from pixel structures in different embodiments on displayed images when no first lens and second lens are disposed are compared. In Table 1, samples A to D are display devices. The sample A, the sample B, and the sample D respectively use the first sub-pixels and the second sub-pixels shown in FIG. 10, FIG. 11A and FIG. 11B, FIG. 15A and FIG. 15B; and the sample C uses a first sub-pixel and a second sub-pixel whose pixel shapes become narrower (compared to FIG. 11A and FIG. 11B). An offset angle refers to a relative rotation angle of the first display panel and the second display panel. Due to an accuracy of an assembly process, when the first display panel and the second display panel are not completely aligned, there will be an offset angle therebetween. The offset angle of 0 in Table 1 indicates that the first display panel and the second display panel are aligned. A number of each sample corresponding to the offset angle represents an interference value sum.

In particular, converting a displayed image into data of a corresponding frequency domain can present interference point distribution, and then a number of interference points is counted to obtain an interference value. In Table 1, when the offset angle is a specific range, the interference value sum is obtained by adding interference value results obtained after each increase of 0.25 degrees. For example, an interference value sum corresponding to 0 degrees to 0.75 degrees is obtained by summing interference values at 0 degrees, 0.25 degrees, 0.5 degrees, and 0.75 degrees. When the offset angle is a constant value (for example, 0 degree), an interference value result of the constant value is used as the interference value sum.

In general, a larger the interference value sum represents more obvious interference patterns occurring on the displayed image. As shown in Table 1, when the first display panel and the second display panel are aligned (the offset angle is 0), an interference value sum of each sample is relatively low. It can be learned that in designs of the sample B, the sample C, and the sample D that change a pixel shape, quality of the displayed image is not affected when the display panels are aligned. When the offset angle is 0-0.75 degrees, it can be noticed that the sample A has a highest interference value sum, and interference to the displayed image is the most severe. Compared with the sample A, using the sample B, the sample C, and the sample D can reduce an interference level by 31% to 78%, thereby effectively reducing generated interference patterns.

TABLE 1

| Offset angle | Sample A | Sample B | Sample C | Sample D |
| --- | --- | --- | --- | --- |
| 0° | 6 | 5 | 6 | 9 |
| 0°-0.75° | 1570 | 338 | 718 | 1080 |

The present invention is described in the foregoing related embodiments, but the foregoing embodiments are merely examples for implementing the present invention. It needs be noted that the disclosed embodiments do not limit scope of the present invention. On the contrary, all modifications and equivalents included in a spirit and the scope of the present invention are included in the scope of the present invention.

What is claimed is:
1. A display device, comprising:
a first display panel having a light outputting surface, wherein the first display panel includes a first scanning line, a first data line, and a plurality of first sub-pixels, and each of the first sub-pixels has a first sub-pixel width, a first side, and a second side connected to the first side, and wherein the first scanning line and the first data line are corresponding to the first sub-pixels and are distributed along the first side and the second side respectively;
a second display panel disposed on one side of the light outputting surface of the first display panel, wherein the second display panel includes a second data line, a second scanning line, and a plurality of second sub-pixels, and each of the second sub-pixels has a second sub-pixel width, a third side, and a fourth side connected to the third side, wherein the second data line and the second scanning line are corresponding to the second sub-pixels and are distributed along the third side and the fourth side respectively, wherein the first side, the second side, the third side, and the fourth side are not parallel to each other, wherein the first scanning line, the second scanning line, the first data line, and the second data line are not parallel to each other, and wherein all of the first sub-pixels and the second sub-pixels are not rectangular;
a plurality of first lenses disposed between the first display panel and the second display panel, each of the first lenses having a first diameter, wherein each of the first diameters is smaller than the second sub-pixel widths, and each of the first lens is a spherical lens; and
a plurality of second lenses disposed between the second display panel and the first lenses, each of the second lenses having a second diameter, the second display panel having a plurality of second pixels, each of the second pixels having at least three sub-pixels of the second sub-pixels to form a second pixel width, wherein each of the second diameters is smaller than the second pixel widths and larger than the second sub-pixel widths;

wherein each of the second sides of the first sub-pixels has a first end point and a second end point, the first end points are substantially located along a third straight line, the second end points are substantially located along a fourth straight line, and the third straight line and the fourth straight line do not overlap; and wherein each of the fourth sides of the second sub-pixels has a third end point and a fourth end point, the third end points are substantially located along a fifth straight line, the fourth end points are substantially located along a sixth straight line, and the fifth straight line and the sixth straight line do not overlap.

2. The display device according to claim 1, wherein the first sub-pixel widths are substantially the same as the second sub-pixel widths.

3. The display device according to claim 1, wherein each of the first sub-pixels of the first display panel forms a first zoomed-in pixel region on the second display panel via the first lenses, the first zoomed-in pixel region having a first zoomed-in width, the first zoomed-in width being larger than the second sub-pixel width.

4. The display device according to claim 1, further comprising a first lens film disposed between the first display panel and the second display panel, the first lens film having a first surface facing the first display panel, and the first lenses being disposed on the first surface.

5. The display device according to claim 1, further comprising a first lens film, the first lens film having a first surface facing the first display panel and a second surface opposite to the first surface, and the second lenses being disposed on the second surface.

6. The display device according to claim 5, wherein the first lenses are disposed on the first surface.

7. The display device according to claim 1, further comprising a first lens film and a second lens film disposed between the first display panel and the second display panel, the second lens film being located between the first lens film and the second display panel, the first lens film having a first surface facing the first display panel, the second lens film having a second surface facing the second display panel, the first lens being disposed on the first surface, and the second lenses being disposed on the second surface.

8. The display device according to claim 1, wherein the second display panel has a light incident surface facing the light outputting surface of the first display panel, the first lenses being disposed on the light incident surface of the second display panel.

9. The display device according to claim 1, wherein there is at least an interval between the first display panel and the second display panel.

10. The display device according to claim 1, wherein the first sides of the first sub-pixels are substantially located on a first straight line, and the third sides of the second sub-pixels are substantially located on a second straight line.

11. The display device according to claim 10, wherein orthographic projections of the first straight line and the second straight line on the first display panel are substantially perpendicular.

12. The display device according to claim 1, wherein there is an angle between orthographic projections of the first side of the first sub-pixel and the fourth side of the second sub-pixel on the first display panel, the angle having a range from 45 degrees to 90 degrees.

13. The display device according to claim 1, wherein the first sides of the first sub-pixels are substantially located on a first straight line, and the third sides of the second sub-pixels are substantially located on a second straight line, the first scanning line extending in parallel to the first straight line, and the second data line extending in parallel to the second straight line.

* * * * *